United States Patent
Pefkianakis et al.

(10) Patent No.: US 10,051,685 B1
(45) Date of Patent: Aug. 14, 2018

(54) ADAPTING RADIOS OF MILLIMETER-WAVE DEVICES

(71) Applicant: Hewlett Packard Enterprise Development LP, Houston, TX (US)

(72) Inventors: Ioannis Pefkianakis, Palo Alto, CA (US); Sanjib Sur, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/601,443

(22) Filed: May 22, 2017

(51) Int. Cl.
| | |
|---|---|
| *H04B 17/00* | (2015.01) |
| *H04W 84/00* | (2009.01) |
| *H04B 7/08* | (2006.01) |
| *H04B 7/155* | (2006.01) |
| *H04W 72/04* | (2009.01) |
| *H04W 72/08* | (2009.01) |
| *H04L 1/00* | (2006.01) |

(52) U.S. Cl.
CPC ........ *H04W 84/005* (2013.01); *H04B 7/0897* (2013.01); *H04B 7/1555* (2013.01); *H04L 1/0002* (2013.01); *H04W 72/0433* (2013.01); *H04W 72/08* (2013.01)

(58) Field of Classification Search
CPC .............................. H04B 17/12; H04B 7/0413
USPC ...... 455/41.1, 41.2, 69, 522, 424, 276.1, 75, 455/68, 414.1, 422.1, 67.11, 562.1, 91, 455/519; 342/368; 370/295, 237, 338, 370/328; 375/224, 267
See application file for complete search history.

(56) References Cited

U.S. PATENT DOCUMENTS

| | | | | |
|---|---|---|---|---|
| 8,175,538 | B1* | 5/2012 | Chen | H04B 17/12 455/424 |
| 9,425,880 | B2 | 8/2016 | Kim et al. | |
| 9,520,972 | B2* | 12/2016 | Gorokhov | H04L 5/0048 |
| 9,680,670 | B2* | 6/2017 | Henry | H04B 7/0413 |
| 2004/0087327 | A1* | 5/2004 | Guo | H04W 52/267 455/522 |
| 2009/0102716 | A1* | 4/2009 | Sego | G01S 7/003 342/377 |
| 2009/0312049 | A1* | 12/2009 | Isomursu | H04M 1/72569 455/550.1 |
| 2010/0008268 | A1* | 1/2010 | Whinnett | H04B 7/0617 370/295 |

(Continued)

OTHER PUBLICATIONS

Mohamed, E. et al.; "Millimeter Wave Beamforming Based on Wifi Fingerprinting in Indoor Environment"; 2015; 6 pages.

(Continued)

*Primary Examiner* — Tan H Trinh
(74) *Attorney, Agent, or Firm* — Hewlett Packard Enterprise Development LP

(57) ABSTRACT

Examples described herein relate to adapting a radio of a millimeter-wave device. In some such examples, the millimeter-wave device is to include a first radio to operate at a first beam direction based on a first set of channel state information (CSI). The millimeter-wave device is also to include a second radio to measure a second set of CSI. The millimeter-wave device is then to include a set of instructions to adapt the first radio to operate at an adapted beam direction based on a third set of CSI. The third set of CSI is to include a signal strength at the adapted beam direction that the millimeter-wave device is to determine based on the first set of CSI and the second set of CSI.

14 Claims, 11 Drawing Sheets

(56) References Cited

U.S. PATENT DOCUMENTS

| | | | |
|---|---|---|---|
| 2010/0075607 A1* | 3/2010 | Hosoya | H04B 7/0617 |
| | | | 455/42 |
| 2010/0130138 A1* | 5/2010 | Nandagopalan | H04W 72/048 |
| | | | 455/69 |
| 2011/0110410 A1 | 5/2011 | Leiba et al. | |
| 2012/0177018 A1* | 7/2012 | Abraham | H04L 1/0027 |
| | | | 370/338 |
| 2013/0057432 A1* | 3/2013 | Rajagopal | H01Q 3/26 |
| | | | 342/368 |
| 2013/0235742 A1 | 9/2013 | Josiam et al. | |
| 2013/0308717 A1 | 11/2013 | Maltsev et al. | |
| 2014/0043979 A1* | 2/2014 | Etemad | H04B 7/2656 |
| | | | 370/237 |
| 2014/0146863 A1* | 5/2014 | Seol | H04B 7/0456 |
| | | | 375/224 |
| 2014/0148107 A1* | 5/2014 | Maltsev | H04B 1/02 |
| | | | 455/91 |
| 2014/0177745 A1* | 6/2014 | Krishnamurthy | H04B 7/0413 |
| | | | 375/267 |
| 2014/0185551 A1 | 7/2014 | Sanderovich | |
| 2014/0206406 A1 | 7/2014 | Cordeiro et al. | |
| 2014/0206408 A1* | 7/2014 | Choi | H04W 4/005 |
| | | | 455/519 |
| 2014/0321375 A1 | 10/2014 | Agiwal et al. | |
| 2015/0156780 A1* | 6/2015 | Kim | H04L 5/0035 |
| | | | 370/331 |
| 2015/0162966 A1* | 6/2015 | Kim | H04B 17/00 |
| | | | 370/252 |
| 2016/0080051 A1* | 3/2016 | Sajadieh | H04B 7/0456 |
| | | | 375/267 |
| 2017/0104516 A1* | 4/2017 | Maltsev | H04B 7/0413 |
| 2017/0295502 A1* | 10/2017 | Stirling-Gallacher | H04W 16/28 |
| 2017/0295508 A1* | 10/2017 | Stirling-Gallacher | H04W 24/10 |
| 2017/0308248 A1* | 10/2017 | Choi | G06F 3/0482 |
| 2017/0311353 A1* | 10/2017 | Liu | H04W 74/0833 |
| 2017/0338924 A1* | 11/2017 | Islam | H04L 5/0048 |

OTHER PUBLICATIONS

Nitsche, T. et al.; "Steering with Eyes Closed: Mm-wave Beam Steering Without In-band Measurement"; Apr. 26-May 1, 2015; 9 pages.

Perahia E. et al.; "Gigabit Wireless LANS: an Overview of IEEE 802.11ac and 802.11ad"; Nov. 29, 2011; 11 pages.

* cited by examiner

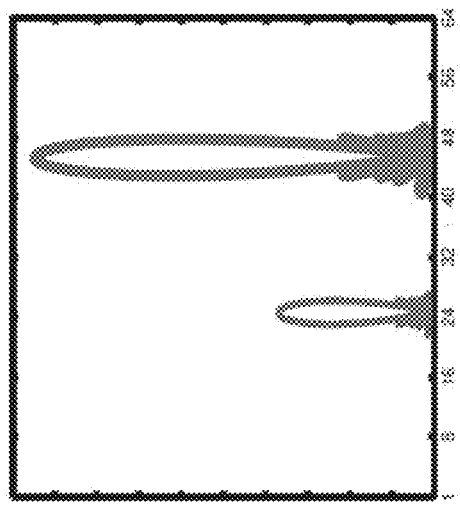
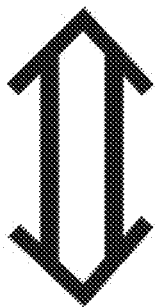
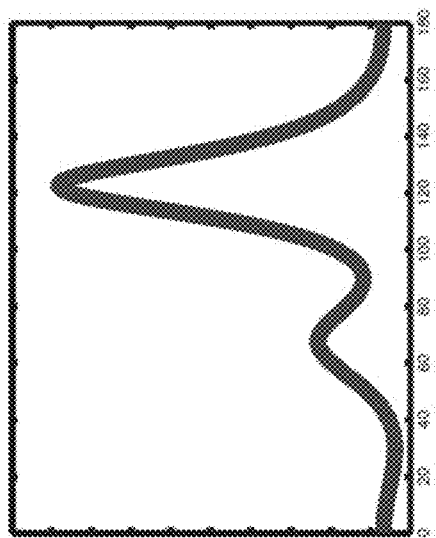
FIG. 5B
FIG. 5A

ADAPTING RADIOS OF MILLIMETER-WAVE DEVICES

BACKGROUND

Millimeter-wave devices may have significant roles to play in next-generation wireless communication networks. In general, a millimeter-wave device may refer to any device suitable to transmit a millimeter-wave wireless signal, including an access point using the IEEE 802.11ad standard developed and maintained by the Institute of Electrical and Electronics Engineers (IEEE). A millimeter-wave signal may refer to any suitable wireless signal of millimeter-wave wavelength, e.g. a 5 mm wavelength at a frequency of 60 GHz as specified under the IEEE 802.11ad standard. A millimeter-wave device may have dual-band capacity to operate a first radio and a second radio simultaneously or independently over two frequency bands. Thus a first radio may operate with a first channel, e.g. a higher millimeter-wave band, and a second radio may operate with a second channel, e.g. a lower Wi-Fi band. Any wireless signal may establish between any two devices a channel, e.g. a communication link or a wireless environment that may be characterized by channel state information (CSI).

BRIEF DESCRIPTION OF THE DRAWINGS

Certain examples are described in the following detailed description with reference to the drawings, of which:

FIGS. 5A-5B are example chart diagrams of representative spatial distributions in two dimensions for a Wi-Fi signal and corresponding millimeter-wave signal, respectively, according to some examples of the present disclosure.

DETAILED DESCRIPTION

Figure 1:
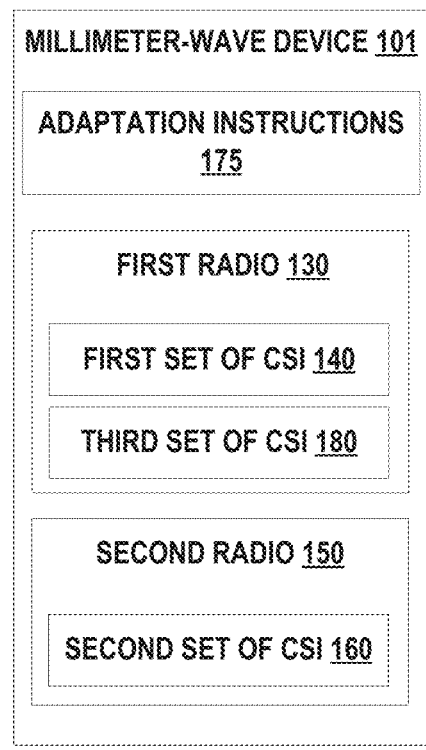
FIG. 1 is a block diagram of a millimeter-wave device, according to some examples of the present disclosure.

Examples of the present disclosure relate to a method for a millimeter-wave device to adapt a first radio from a current beam direction to an adapted beam direction, e.g. from a first set of channel state information (CSI) to a third set of CSI in the same channel, based on measuring by a second radio a second set of CSI. The first radio may thereby adapt to channel variation without performing a probing step, e.g. to measure signal strengths over available beam directions. Probing may refer to any active transmission by a radio to evaluate a signal or a channel, e.g. to transmit packets for the purpose of collecting feedback to adapt transmission. A channel may refer to a communication link or a wireless environment that may be characterized by CSI, such that any wireless signal sent or received by a device may also communicate CSI that characterizes or refers to a channel. In general, a millimeter-wave device may refer to any device suitable to communicate by millimeter waves, e.g. via millimeter-wave radio. Similarly, a millimeter-wave radio may refer to any radio suitable to transmit, to send, or to receive a millimeter-wave signal, including via Wi-Fi wireless standards. A millimeter-wave device may have dual capacity to operate with a first radio, e.g. a millimeter-wave radio, and a second radio, e.g. a Wi-Fi radio, simultaneously or independently over distinct frequency bands. A Wi-Fi radio may refer to any radio suitable to transmit, to send, or to receive a non-millimeter-wave wireless signal via Wi-Fi wireless standards. Thus while a first, millimeter-wave radio is to operate at a current beam direction based on a first set of CSI of a millimeter-wave channel, a second, Wi-Fi radio may measure a second set of CSI of a Wi-Fi channel. The millimeter-wave device may then adapt the first, millimeter-wave radio from the first set of CSI to an adapted or third set of CSI of the millimeter-wave channel that it determines from the first set of CSI and the second set of CSI. Thus, the first radio may operate or transmit an adapted signal without probing for CSI, improving for example the speed or efficiency of the millimeter-wave device or its first radio.

As noted above, millimeter-wave communication corresponding to the 30 to 300 GHz frequency band of millimeter wavelengths (e.g., 1 cm to 1 mm) has been proposed to play a larger role in next-generation wireless technology networks, such as fifth generation (5G) networks. Current wireless devices that have been developed to operate with Wi-Fi wireless technology may be based on interoperability standards developed and maintained by the Institute of Electrical and Electronics Engineers (IEEE) under the IEEE 802.11 family of media access control (MAC) and physical layer (PHY) rate specifications, which currently implements wireless communications over a few specific frequency bands, e.g., 2.4, 3.6, 5, and 60 GHz. Of these bands, Wi-Fi signals under IEEE 802.11ac or 802.11n may operate in the lower frequency bands of 2.4 and 5 GHz (e.g., 12 or 6 cm wavelengths, longer than 1 cm). However, IEEE 802.11ad may operate communication at 60 GHz frequency (e.g., 5 mm wavelength) of unlicensed millimeter-wave spectrum, presenting a promising platform for millimeter-wave wireless standards. New opportunities for improvement in millimeter-wave wireless communication, which may offer up to 7 GHz of unlicensed spectrum, may continue to be explored by the IEEE as well as by others, such as the European Computer Manufacturers Association (ECMA). Some advantages of millimeter-wave wireless may derive from the fact that millimeter-wave frequencies are higher than those currently used for Wi-Fi (e.g., 2.4 and 5 GHz). Correspondingly, millimeter-wave antennas may have a smaller form factor to allow larger phased arrays of antennas to be used in small millimeter-wave devices, including mobile devices. Such millimeter-wave communication by phased arrays of antennas may enable higher rates of Gigabit per second (Gbps) throughput to support data-intensive applications, such as video streaming, etc., with for example 7 Gbps of raw PHY bit-rate at higher channel bandwidths and 2.16 GHz higher than available to 5 GHz Wi-Fi. Thus, millimeter-wave wireless may facilitate "wire-like" speeds for next-generation Wi-Fi.

Nevertheless, the higher frequency of a millimeter-wave signal may render it more vulnerable to channel propagation loss, including due to a correspondingly shorter wavelength. For example, a 60 GHz signal may incur 21.6 dB more loss of signal strength compared to a 5 GHz Wi-Fi signal. Thus, millimeter-wave devices may tend to use beamforming techniques to construct a directional beam that facilitates millimeter-wave communication. A directional beam may refer to any analog phase shifting of the radiofrequency energy of a radio toward a spatial direction in a channel, e.g. a "beam direction" or "sector", which may boost signal strength to mitigate channel propagation loss. For example, IEEE 802.11ad currently recommends use of a phased array of antennas to form directional beams. A phased array may be configured to perform beamforming according to a predefined codebook of beam directions or sectors and a modulation and coding scheme (MCS), as detailed below. In brief, a millimeter-wave device may determine a "best" beam direction to boost signal strength or throughput along a dominant path of a channel, such as by probing the channel for signal strengths over all beam directions or sectors available to a phased array. The device may use CSI of the channel to identify the dominant path. The dominant path of communication may correspond to a line-of-sight path to a second device.

However, such beamforming or probing may in turn render the millimeter-wave device vulnerable to variations in a "best" beam direction, such as via device mobility or blockage. For example, blockage of the dominant path by a human body may result in up to a 30 dB drop in the signal strength of such a millimeter-wave signal directed by beamforming via phased array. Thus millimeter-wave devices may tend to respond, as in to a drop in signal strength, by adapting from a "best" or current beam direction to a "new best" or adapted beam direction. Such adaptation may correspond to a shift in the dominant path that was previously identified for a given channel. Such adaption may be performed by probing, similarly to an earlier determination of the current beam direction as above, e.g. by probing the channel for signal strengths over all available beam directions. However, the search cost or overhead incurred by such an exhaustive probing may tend to grow nearly quadratically with the total number of beam directions or sectors available to a phased array, such that probing may contribute significant delay to adaptation. After the millimeter-wave device determines the adapted beam direction and its signal strength, e.g. by probing, it may apply a PHY rate adaptation algorithm to adapt the radio to a corresponding "best" throughput PHY rate, e.g. based on the MCS. As a result of total delay or "convergence time" used for adaptation by probing, millimeter-wave devices may tend to perform poorly, especially in dynamic wireless environments wherein a millimeter-wave channel may undergo frequent variations requiring adaptation. For example, a millimeter-wave device performing a process of adaptation by probing may require a convergence time on the order of seconds to determine an adapted beam direction and PHY rate. The IEEE 802.11ad standard currently does not include a recommended method for adaptation of the beam direction and PHY rate. Thus, it may be desirable to reduce the convergence time for adaption of the beam direction and PHY rate, particularly in cases where the millimeter-wave channel is subject to dynamic variations. It may also be desirable to perform such an adaptation without probing for signal strengths.

Several examples in the present disclosure provide a method for a millimeter-wave device of dual capacity to adapt a first, e.g. millimeter-wave, radio operating at a current beam direction based on a first set of CSI in a first channel, to an adapted beam direction based on a third set of CSI in the first channel, by measuring a second set of CSI in a second channel by a second, e.g. non-millimeter-wave, radio. The first radio thereby need not perform probing of the first channel or of adapted signal strengths over all available beam directions to determine the adapted beam direction, its signal strength for an adapted signal, and a corresponding PHY rate or adapted set of parameters at which to operate the first radio. The second radio may be a Wi-Fi radio that is omni-directional, unlike the first radio. In particular, the millimeter-wave device may determine a spatial distribution of signal strengths by the second radio, including a direction of maximum signal strength. The millimeter-wave device may thereby track angular shifts over time via spatial distribution of the second radio. Based on the angular shift as measured by the second radio and the known beam pattern at the current beam direction of the first radio, including a known signal strength at the current beam direction, the millimeter-wave device may determine an adapted signal strength at the adapted beam direction. The millimeter-wave device may determine an adapted set of parameters of the first radio by mapping the signal strength to a PHY rate via algorithm. The first radio may then operate an adapted signal based on the adapted set of parameters. This method may benefit the operation of the millimeter-wave device, for example by reducing the convergence time for adaptation to a new best or adapted beam direction and PHY rate. This method may also avoid the probing process, as noted above. In these ways and others, the examples herein may improve performance of a millimeter-wave device or suitable radio.

The examples of the present disclosure are hereafter described with reference to the following figures. Unless noted otherwise, the figures and accompanying descriptions are non-limiting, such that no element is exclusive to or characteristic of any particular example. Accordingly, features from one example may be freely incorporated into other examples without departing from the spirit and scope of the present disclosure.

A millimeter-wave device for use with the present disclosure is described with reference to FIG. 1. In that regard, FIG. 1 is a block diagram of a millimeter-wave device 101, according to some examples of the present disclosure. The millimeter-wave device 101 includes a first radio 130 to operate at a current beam direction based on a first set of CSI 140 and a second radio 150 to measure a second set of CSI 160. The millimeter-wave device 101 also includes adaptation instructions 175 to adapt the first radio 130 to operate at an adapted beam direction based on a third set of CSI 180, including a signal strength at the adapted beam direction that the millimeter-wave device 101 is to determine based on the first set of CSI 140 and the second set of CSI 160. The first radio 130 and the second radio 150 may be arranged in any suitable size, shape, form, and configuration. The millimeter-wave device 101 as illustrated in FIG. 1 may thereby include a dual capacity to operate the first radio 130 and the second radio 150 simultaneously, concurrently, or otherwise independently of each other. In several examples of the present disclosure, the millimeter-wave device 101 operates the first radio 130 and the second radio 150 over distinct or non-overlapping frequency bands. The millimeter-wave device 101 may include other or additional capacity. In some examples, the millimeter-wave device 101 includes tri-band capacity to operate likewise by three radios. Without limitation, the millimeter-wave device 101 may include any combination of digital or analog elements with respect to either of the first radio 130 and the second radio 150 as well as any combination of other elements suitable to a wireless communication device, including other elements to facilitate one or more integrated circuits. Similarly, the sets of CSI 140, 160, and 180 may be understood to illustrate one or more states of the millimeter-wave device 101 with respect to first radio 130, second radio 150, and adaptation instructions 175, without limitation to device structure, according to examples of the present disclosure.

First radio 130 illustrates a wireless radio of any size, shape, and configuration suitable to operate at a current beam direction based on a first set of CSI 140. The first radio 130 may be a millimeter-wave radio, such as a 60-GHz radio, that is to operate by beamforming, with respect to a specific spatial sector or beam direction. In several examples of the present disclosure, the first radio 130 includes a set of phased arrays of antennas to perform beamforming, as explained in detail below. The first radio 130 may operate based on the first set of CSI 140 in a first channel. The first channel may be with respect to a first signal constructed by beamforming via phased array of antennas of the first radio 130. Thus, the first radio 130 may operate to send, to receive, or otherwise to transmit a millimeter-wave signal as a first signal of the millimeter-wave device 101 based on the first set of CSI 140.

Second radio 150 illustrates a wireless radio of any size, shape and configuration suitable to measure a second set of CSI 160. The second radio 150 may be a non-millimeter-wave radio that is omni-directional or without any specific beam direction, including a Wi-Fi, Long-Term Evolution (LTE), or other wireless radio suitable to measure a second set of CSI 160. In several examples of the present disclosure, the second radio 150 is to collect feedback on a spatial distribution of signal strengths, as explained in detail below. The second radio 130 may operate to measure the second set of CSI 160 in a second channel. The second channel may be with respect to a second signal of the second radio 150. The second channel or the second signal may be distinct from the first channel or the first signal. The second radio 150 may measure the second set of CSI 160 based on an initial set of CSI or via snapshots over time of the second channel. Thus, the second radio 150 may track the second set of CSI 160 over time. The second radio 150 may operate to send, to receive, or otherwise to transmit a second signal of the millimeter-wave device 101 and to measure the second set of CSI 160 in part by receiving feedback or by tracking of a spatial distribution.

The sets of channel state information (CSI) 140, 160, and 180 each illustrate a determination or characterization of a channel for signal propagation or throughput by the respective radio 130 or 150, as illustrated. In some examples, the second set of CSI 160 is based on an initial set of CSI of the second radio 150 operating in the second channel, so the second set of CSI 160 may track change over time. Each set of CSI may include signal characteristics such as scattering, fading, and power decay over spatial direction and spatial distance, as determined by the millimeter-wave device 101. For example, the millimeter-wave device 101 may estimate a set of CSI by feedback from a second wireless device. In general, each set of CSI 140, 160, and 180 may correspond to a channel between a pair of devices, e.g. a transmitter and receiver, such that a transmitter with $N_t$ antennas and a receiver with $N_r$ antennas corresponds to a set of CSI as a matrix of $N_t \times N_r$ complex numbers. In general, each set of CSI may allow for adaptation of signal transmission between the devices, based on the current known state of the respective channel. Thus, while FIG. 1 illustrates the sets of CSI 140, 160, and 180 as representative blocks included in radios 130 or 150, it is understood that CSI may represent a current known state of a channel of the respective radio. Wherein FIG. 1 illustrates the first radio 130 to include both sets of CSI 140 and 180, the first radio 130 is understood to adapt operation from the first set of CSI 140 to the third set of CSI 180 over an interval of time, rather than to operate at both of the sets of CSI simultaneously.

Adaptation instructions 175 illustrate a set of instructions of the millimeter-wave device 101 of any format, type, and configuration by which the millimeter-wave device 101 is to adapt the first radio 130 to operate at an adapted beam direction based on a third set of CSI 180, including a signal strength at the adapted beam direction that the millimeter-wave device 101 is to determine based on the first set of CSI 140 and the second set of CSI 160.

The millimeter-wave device 101 may determine the third set of CSI 180 with respect to an adapted signal of the first radio 130, including a signal strength of the adapted signal at the adapted beam direction of the first radio 130. The millimeter-wave device 101 may thereby adapt the first radio 130 to operate at the adapted beam direction with respect to the adapted signal and based on the third set of CSI 180 determined by the millimeter-wave device 101. The adaptation instructions 175 may be implemented to be executable by the millimeter-wave device 101, as in firmware, memory, or other suitable computer-readable storage medium for use with a processor or other suitable processing resource of the millimeter-wave device 101. In several examples of the present disclosure, the millimeter-wave device 101 implements the adaptation instructions 175 based on a threshold of variation in one of the first set of CSI 140 and the second set of CSI 160, including a change in signal strength or transmission of one of the first signal of the first radio 130 or of the second signal of the second radio 150.

Figure 2A:
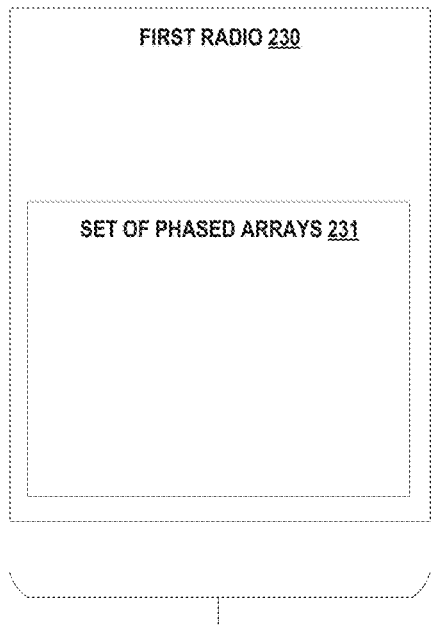
FIGS. 2A-2C are block diagrams of a set of phased arrays of antennas for use with a first radio, according to some examples of the present disclosure.
Figure 2B:
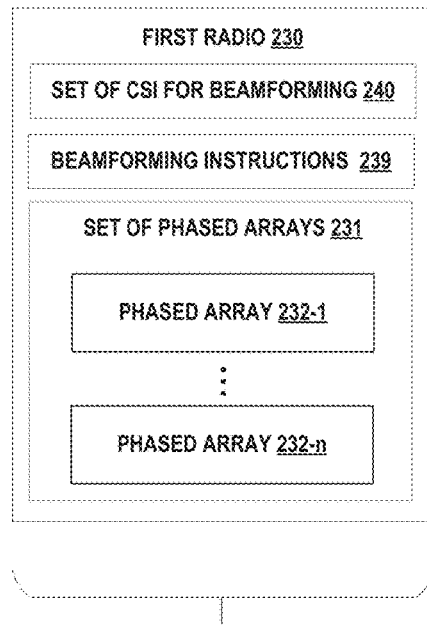
Figure 2C:
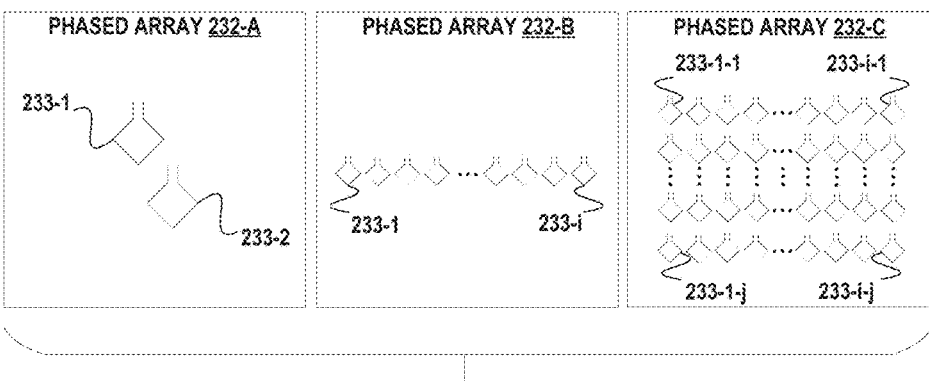

A set of phased arrays of antennas for use with a millimeter-wave device to perform beamforming is described with reference to FIGS. 2A-2C. In that regard, FIGS. 2A-2C are block diagrams of a set 231 of phased arrays 232 of antennas 233 for use with a first radio 230, according to some examples of the present disclosure. In particular, FIG. 2A illustrates a first radio 230 including the set 231 of phased arrays 232; FIG. 2B illustrates the first radio 230 including in the set 231 $n$ phased arrays 232-1 through 232-$n$, beamforming instructions 239, and a set of CSI for beamforming 240; and FIG. 2C illustrates example phased arrays 232, including a phased array 232-A with an array of two antennas 233, a phased array 232-B with a one-dimensional or linear array of i antennas 233-1 through 233-$i$, and a phased array 232-C with a two-dimensional or planar array of i×j antennas 233-1-1 through 233-$i$-$j$. The first radio 230 of FIGS. 2A-2B may be substantially identical to the first radio 130 of FIG. 1, such that the millimeter device 101 of FIG. 1 includes the set 231 of phased arrays 232 of antennas 233 of the first radio 230 as in FIGS. 2A-2B to perform beamforming. Similarly, the set of CSI for beamforming 240 may include either of the first set of CSI 140 and the third set of CSI 180 of FIG. 1, such that the first radio 130 of FIG. 1 operates with a set of beamforming instructions 239 as in FIG. 2B. The set 231 of phased arrays 232 of the first radio 230 may include one or more phased arrays 232 in any suitable configuration, including one or more that are distinct from each other, such as between 232-A, 232-B, and 232-C. Similarly, any phased array 232 may include two or more antennas 233 of any shape, size, type, material, and configuration, arranged in any manner suitable to perform beamforming of a wireless radio signal. Any such phased array 232 may be arranged to have a uniform separation distance between its antennas 233, such as in 232-B or 232-C.

As noted earlier, beamforming by any representative phased array 232 may construct a radio signal characterized as a plane wave or directional beam, which may refer to any analog phase shifting of radiofrequency energy toward a specific spatial direction, e.g. a "sector" or "beam direction". The set 231 of phased arrays 232 may thereby boost signal strength in a first channel of the first radio 230, including by mitigating channel propagation loss. For example, the IEEE 802.11ad standard recommends use of phased arrays of antennas to form directional beams for millimeter-wave wireless communications in the 60-GHz band. The set 431 of phased arrays 232 may be configured to perform beamforming according to the beamforming instructions 239, which may be preconfigured based on the first radio 230. In several examples of the present disclosure, beamforming instructions 239 are preset to use a codebook of available beam directions, based on a modulation and coding scheme (MCS).

In detail, beamforming by the first radio 130, such as via representative phased array 232, may include a set of quasi-omni antennas 233 arranged in any suitable spatial arrangement, such as one-dimensional linear as 232-B or two-dimensional planar as 232-C of FIG. 2C. The phased array 232 may construct different directional beams by applying different sets of discrete configuration weights over its antennas 233 to denote a distinct set of phases and amplitudes over its set of antennas 233. For example, a one-dimensional linear phased array as 232-B with i=N antennas 233 may construct K directional beams such that for a uniform separation distance d between antennas and a signal at wavelength λ, the pattern of the $k^{th}$ beam direction is characterized by array factor or beam pattern $G_k(\varphi)$, denoting gain G at azimuthal direction φ as a sum of configuration weights c(n, k) for each of its n antennas:

$$G_k(\varphi) = \Sigma_{n=1}^{N} c(n,k) \cdot \exp(j2\pi nd \cos \varphi/\lambda) \quad (1)$$

The configuration weights c(n, k) are designed to boost the signal strength toward a desired azimuthal direction φ via phase construction, while cancelling signal strength toward other, unintended directions. The representative beam pattern $G_k(\varphi)$ may thereby result from the spatial arrangement of antennas 231 and the set of configuration weights c(n, k) applied to them by the phased array 232. The beam pattern $G_k(\varphi)$ of a directional beam may amplify a channel, for example by aligning to a dominant path of the channel. In several examples of the present disclosure, a two-dimensional planar phased array 232, such as one with an i=4×j=8 matrix of antennas 231, constructs a beam pattern $G_k(\varphi, \theta)$ in directions of azimuth φ and elevation θ in a manner analogous to the one-dimensional linear phased array 232, as above.

Figures 3A, 3B:
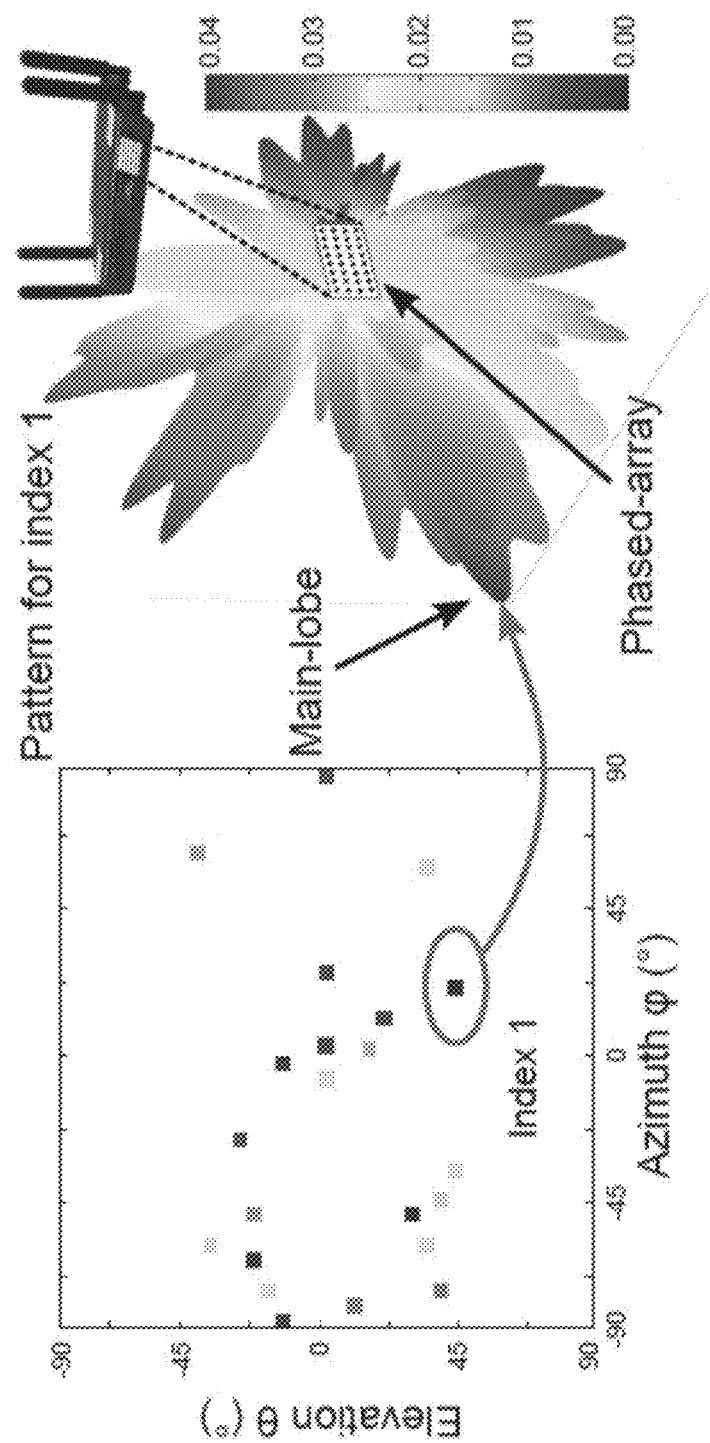
FIGS. 3A-3B are example chart diagrams of a representative beam pattern of beamforming via phased array, according to some examples of the present disclosure.

However, discrete configuration weights may not achieve ideal phase control. Therefore, a representative beam pattern $G_k(\varphi, \theta)$ may not cancel out a signal uniformly over all directions other than in its desired beam direction (φ, θ). In that regard, FIGS. 3A-3B are example chart diagrams of a representative beam pattern of beamforming via phased array, according to some examples of the present disclosure. In particular, FIG. 3A illustrates certain beam directions of a phased array 232, including the representative beam direction $G_k(\varphi, \theta)$ as highlighted upon a discrete spatial index of available beam directions; and FIG. 3B illustrates representative beam pattern $G_k(\varphi, \theta)$ as a spatial distribution of signal radiation.

In some examples of the present disclosure, discretized configuration weights facilitate limited phase control per antenna 233, for example two-bit control with four phase values, e.g. 0°, 90°, 180°, and 270°. Use of such discretized configurations weights may tend to be desirable, for example, to reduce overall costs and complexity associated with operation of the phased array 232. A spatial distribution of signal radiation as measured in FIG. 3B may then result. For example, the millimeter-wave device 101 may be fixed to use a representative beam pattern $G_k(\varphi, \theta)$ and to generate saturated transmission control protocol (TCP) traffic over a channel to a wireless device, while it is manually rotated in the presence of a sniffing device so as to thereby measure the spatial distribution of signal radiation for the beam pattern $G_k(\varphi, \theta)$. The desired beam direction (φ, θ) of the beam pattern $G_k(\varphi, \theta)$ may thus correspond to a highest signal strength or a "main lobe" of radiation, as illustrated in FIG. 5B. Yet FIG. 5B further illustrates that there may be several other or arbitrary "side lobes" of signal radiation in addition to the "main lobe" toward its desired direction (φ, θ). A "main lobe" and "side lobes" may together define the "peak lobes" of beam pattern $G_k(\varphi, \theta)$.

Therefore with respect to a channel with dominant path in a direction (φ, θ), a "best" beam direction k* may be the beam pattern $G_k(\varphi, \theta)$ that most amplifies a complex gain D(φ, θ) of the channel, as when a "peak lobe" of the beam pattern $G_k(\varphi, \theta)$ aligns to direction (φ, θ). Thus, k* may be determined from complex gain D(φ, θ) and beam pattern $G_k(\varphi, \theta)$:

$$k^* = \underset{k \in \{1 \ldots K\}}{\operatorname{argmax}} \sum_{\varphi, \theta} G_k(\varphi, \theta) \cdot D(\varphi, \theta) \quad (2)$$

In general, a millimeter-wave channel like the 60-GHz band of the IEEE 802.11ad standard may tend to be sparse, such that it includes a single dominant path, e.g. a line-of-sight path, of a signal strength that is orders of magnitude stronger than other paths, e.g. weak reflections. Yet as noted above, a beam pattern $G_k(\varphi, \theta)$ may align with such a dominant path with either a "main lobe" or an arbitrary "side lobe". Therefore of the available beam directions, the ones spatially closest to the dominant path direction (φ, θ) may not always result in the best beam direction k*, as the dominant path may align with a "side lobe" better than any "main lobe". Thus, mapping of a dominant path to a best beam direction k* may not be one-to-one. For example, a millimeter-device may tend to probe a channel for feedback to determine the complex gain D(φ, θ) with respect to available beam directions or to beam patterns $G_k(\varphi, \theta)$.

With respect to adaptation, variation in the dominant path (φ, θ) of the channel may require the phased array 232, the radio 230, or the millimeter-wave device 101 of FIG. 1 as a whole to perform adaptation to a "new best" or adapted beam direction k*'. As noted earlier, such an adaptation may be triggered by any preset threshold of variation, including in CSI, signal strength, transmission frame, per-MCS packet-error-rate statistics of multiple packets, or any other suitable measurement of a wireless link performance. For example, the dominant path (φ, θ) of the channel may shift by (Δφ, Δθ) as a result of such variation. In light of the above consideration or complication in path mapping, a representative millimeter-wave device may tend to implement a searching method to perform an exhaustive scan for adaptation to an adapted beam direction k*' based on probing for signal strengths to determine a best alignment for the new dominant path of the channel. For example, the IEEE 802.11ad standard supports a beamforming training (BFT) process to determine a highest signal strength between a pair of devices. Such BFT process may be used to identify an initial best beam direction k*, as well as subsequent adapted beam directions k*' of any adaptations. The BFT process may include a mandatory sector level sweep phase (SLS) and an optional beam refinement phase (BRP) to evaluate all combinations of available beam directions or sectors. However, such a searching process may consume significant operation time, resulting in poor performance of the millimeter-wave device due to a slow recovery or "convergence time" for adaptations, especially in dynamic environments with frequent variation, as previously noted.

Figure 4A:
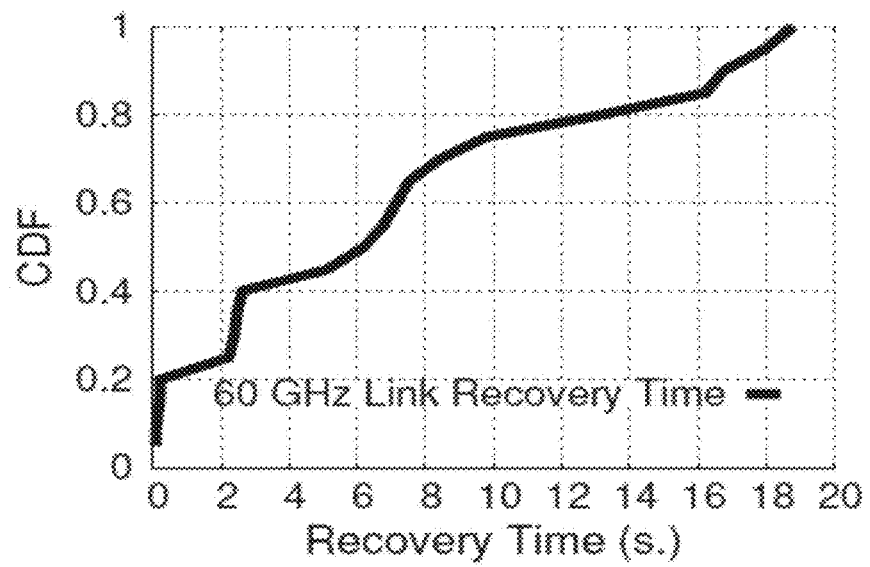
FIGS. 4A-4B are example chart diagrams of representative measurements of convergence time and of signal strength after dynamic blockage scenarios of a millimeter-wave device, according to some examples of the present disclosure.
Figure 4B:
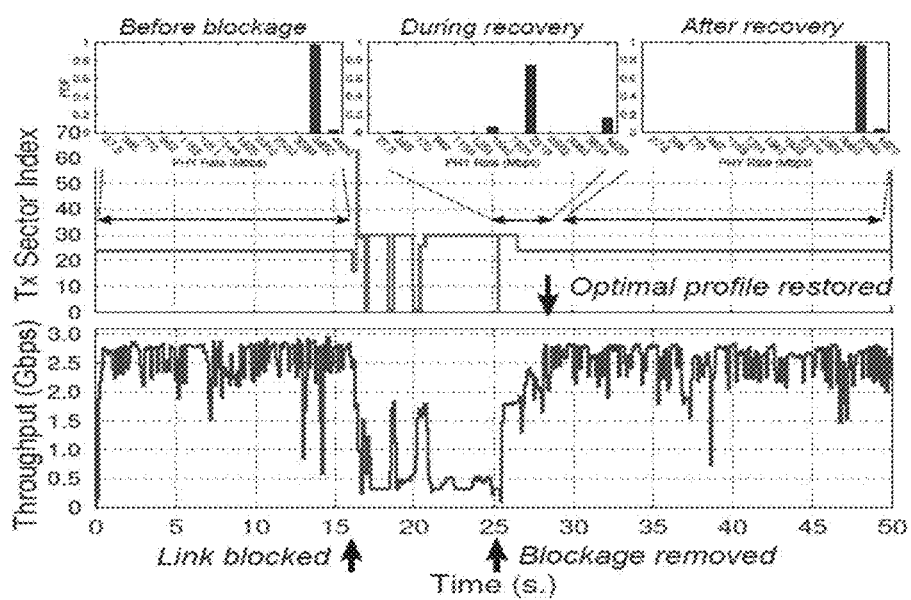

In that regard, FIGS. 4A-4B are example chart diagrams of representative measurements of convergence time and of signal strength after dynamic blockage scenarios of a millimeter-wave device, according to some examples of the present disclosure. The millimeter-wave device may operate with the IEEE 802.11ad standard at 60 GHz and may generate saturated TCP traffic for measurement purposes during its blockage. In particular, FIG. 4A illustrates convergence time for adaptation over twenty blockage scenarios, ranked from least to most delay; and FIG. 4B illustrates convergence time and signal strength during adaptation after removal of a representative blockage. In FIG. 4A, the median convergence time over twenty temporary or dynamic blockages by the human body is shown to be 6.1 seconds, with convergence times varying from 90 milliseconds to 18.8 seconds. For example, a millimeter-wave device with 128 available beam directions may take 1.25 ms to perform such beam searching. However, the millimeter-wave device may also then determine for each beam direction a best-throughput PHY rate based on MCS, which may rely on per-MCS packet-error-rate statistics of multiple packets. Thus, the total convergence times may be significantly higher due to probing for the signal strength per available beam direction, such as is indicated in FIG. 4A. In FIG. 4B, a representative dynamic blockage is shown to result in a drop in the signal strength of more than 2 Gbps on average, requiring 3.8 seconds (between the 25th second and the 28th second) for the millimeter-wave device to recover the best beam direction k* and PHY rate upon blockage removal. The slow convergence times as illustrated in FIGS. 4A-4B may be attributed to poor performance of the costly searching or probing process of the IEEE 802.11ad standard, as above, for adaptation to dynamic shifts.

In several examples of the present disclosure, the millimeter-wave device 101 of FIG. 1 may instead apply adaptation instructions 175 to perform an adaptation. In several examples of the present disclosure, the millimeter-wave device 101 leverages its dual capacity to "predict" or to determine a third set of CSI 180 of the first radio 130, including a signal strength at the adapted beam direction k*' of the first radio 130, based on the first set of CSI 140 at the current beam direction k* of the first radio 130 and the second set of CSI 160 as measured by the second radio 150. Ultimately, with respect to a shifted channel with new dominant path in a direction (φ+Δφ, θ+Δθ), the adapted beam direction k*' may be the beam pattern $G_k(\varphi, \theta)$ that most amplifies a shifted complex gain D'(φ+Δφ, θ+Δθ) of the channel, as when a "peak lobe" of the beam pattern $G_k(\varphi, \theta)$ aligns to direction (φ+Δφ, θ+Δθ). Thus as presented above for the best beam direction k* with respect to equation (2), k*' may also be determined from shifted complex gain D'(φ+Δφ, θ+Δθ) and beam pattern $G_k(\varphi, \theta)$:

$$k^{*'} = \underset{k \in \{1...K\}}{\mathrm{argmax}} \sum_{\varphi, \theta} G_k(\varphi, \theta) \cdot D'(\varphi + \Delta\varphi, \theta + \Delta\theta) \quad (3)$$

In brief, the millimeter-wave device 101 may estimate the shifted complex gain D'(φ+Δφ, θ+Δθ) based on determining by the second radio 150 of the angular shift (Δφ, Δθ) for the dominant path, and based on a known complex gain D(φ, θ) at the current beam direction of the first radio 130. The millimeter-wave device 101 may then apply equation (3) with known beam patterns $G_k(\varphi, \theta)$ of the first radio 130 based on the first set of CSI 140 to determine the adapted beam direction k*'. In particular, the millimeter-wave device 101 may use the known beam patterns $G_k(\varphi, \theta)$ for the adaptation without searching or probing by the first radio 130, since the first radio 130 was already operating in the channel based on a first set of CSI 140.

In detail, the second set of CSI 160 may characterize a second channel of the second radio 150 by a matrix $h_W$ measured by the second radio 150. The second set of CSI 160 of the second radio 150 may be omni-directional and unlike the first set of CSI 140, such that the second radio 150 may determine from it a spatial distribution of signal strengths. In that regard, FIGS. 5A-5B are example chart diagrams of representative spatial distributions in two dimensions for a Wi-Fi signal and corresponding millimeter-wave signal, respectively, according to some examples of the present disclosure. As noted earlier, the second radio 150 may track a spatial distribution, such as by measuring the second set of CSI 160 based on an initial set of CSI or via snapshots over time. In some examples, a 5 GHz Wi-Fi signal under the IEEE 802.11ac standard may also support concurrent downlink from a suitable device based on multi-user multiple input, multiple output (MU-MIMO) via beamforming. To support such beamforming, the second radio 150 may use a sounding protocol to probe multiple user devices and collect a very high throughput (VHT) compressed beamforming feedback (CBF) parameter to decorrelate transmission data from multiple user devices. The CBF may be represented as a steering matrix V, which may be estimated by applying singular value decomposition (SVD) on a channel matrix H. Each of the multiple user devices may also send a signal-to-noise ratio (SNR) parameter to the second radio 150, such as a per-subcarrier SNR in MU-MIMO or average SNR of subcarriers across single-user, SU-MIMO.

By analysis of the spatial distribution of the second set of CSI 160, the millimeter-wave device 101 may determine a signal strength over each angle as a projection from the second channel of the second radio 150. The projection of the second channel towards a mean direction θ for a wavelength $\lambda_W$ may be determined as follows, where $N_W$ is the number of antennas within the second channel and d is the distance between antennas:

$$\Sigma_{i=1}^{N_W} h_W^i \cdot \exp(-j2\pi(i-1)d \cos\theta/\lambda_W) \quad (4)$$

FIG. 5A shows a representative spatial distribution of a Wi-Fi signal of the second channel. Thus, the Wi-Fi signal of FIG. 5A may correspond to a representative second set of CSI 160. The second radio 150 may also thereby determine a direction of maximum signal strength.

Similarly to the second set of CSI 160, the first set of CSI 140 may likewise characterize a first channel by a matrix $h_M$ for the first radio 130 operating at a current beam direction. The first set of CSI 140 and the second set of CSI 160 may be offset by a multipath parameter constant c, arising from a link budget difference between $h_M$ and $h_W$ with respect to different array gain ArrayG, transmit power Txp, noise floor N, and free space loss FLoss:

$$c = \text{ArrayG}_M - (N_M - N_W) - \text{FLoss}_M - (Txp_W - Txp_M) \quad (5)$$

In some examples of the present disclosure, the array gain ArrayG$_M$ at 60 GHz is 30 dB, the difference in transmit power Txp is 30 dB, the difference in noise floor N is 20 dB, and the difference in free space loss FLoss is 20 dB average, such that the constant c equals 40 dB.

In some examples of the present disclosure, the millimeter-wave device 101 may determine the third set of CSI 180 and an adapted beam direction of the first radio 130 based on comparing the measured matrix $h_M$ from the first set of CSI 140 pointing toward a direction θ to an estimated matrix $h_W$ of the second set of CSI 160 projected toward the same direction θ by derivation from equation (4), accounting for equation (5). The third set of CSI 180 may thereby be estimated with respect to any angle or beam direction θ' over the set of angles Θ to account for a multipath environment of signal transmission, wherein a parameter $\alpha_\theta \in [0, 1]$ is also computed for each angle θ and related to the signal strength at the angle θ:

$$f(h_W, \alpha, \theta) = \sum_{\theta \in \Theta, \alpha_\theta \in \alpha} \frac{\alpha_\theta}{k}\left(\sum_{i=1}^{N_W} h_W^i \cdot \exp(-j2\pi(i-1)d\cos\theta/\lambda_W)\right) \quad (6)$$

The relevant characteristics of a multipath environment may be estimated by computing an α vector, according to the following optimization problem for use in previous equation (6):

$$\{\hat{\alpha}, \hat{\Theta}\} = \underset{\{\alpha, \Theta\}}{\operatorname{argmax}} \|f(h_W, \alpha, \theta)\| - |h_M(\theta)|\|^2 \quad (7)$$

FIG. 5B shows a representative spatial distribution of a millimeter-wave signal of the first channel. Thus, the millimeter-wave signal of FIG. 5B may correspond to a representative third set of CSI 180, as determined based on the spatial distribution of the Wi-Fi signal of the second channel of FIG. 5A. Based on such a spatial distribution or third set of CSI 180, the millimeter-wave device 101 may estimate the signal strength at the adapted beam direction k*' of the first radio 130. The millimeter-wave device 101 may map the signal strength to a PHY rate of the first radio 130. Thus, equations (4) through (7) may facilitate adaptation instructions 175 of the millimeter-wave device 101 to adapt the first radio 130 from the first set of CSI 140 to the third set of CSI 180, including a determined signal strength at an adapted beam direction of the first radio 130, according to several examples of the present disclosure.

In several examples of the present disclosure, the millimeter-wave device 101 "tracks" or determines the angular shift (Δφ, Δθ) in the dominant path of the first channel of the first radio 130, as noted previously. In some examples, the second radio 150 measures the second set of CSI 160 based on an initial set of CSI of the second channel, such as at an initial time of operation of the second radio 150. In some examples, the second radio 150 measures the second set of CSI 160 as spatial snapshots of the second channel over time, including to track variation in the second channel. The spatial snapshots may include a spatial distribution, as with respect to equation (4) above. The millimeter-wave device 101 may then determine a translation from a profile state $W_1$ at time $t_1$ to a profile state $W_2$ at time $t_2$, as so:

$$\{\Delta\varphi, \Delta\theta\} = \underset{\Delta\varphi, \Delta\theta}{\operatorname{argmin}} |W_1(\varphi, \theta) - W_2(\varphi + \Delta\varphi, \theta + \Delta\theta)|^2 \quad (8)$$

The shift in the second channel thus derived via measurement by the second radio 150 of the second set of CSI 160 may be equivalent to the shift in the dominant path of the first channel.

To avoid abrupt error from snapshot measurements or profiles over time, the millimeter-wave device 101 may apply a time-domain linear filter, for example as for Δφ and taking α=0.3:

$$\Delta\varphi(t+1) = \alpha \cdot \Delta\varphi(t) + (1-\alpha) \cdot \Delta\varphi(t+1) \quad (9)$$

By tracking or storing a profile shift or a spatial distribution of the second radio 150 over a time domain, the millimeter-wave device 101 may trigger an adaptation of the first radio 130 dynamically over any subsequent time interval. For example, the millimeter-wave device 101 may trigger such an adaptation of the first radio 130 when transmission or performance of the first radio 130 drops below a threshold, regardless for example of an amount of absolute angular shift (Δφ, Δθ) or of the dynamic variation in a signal strength of the second radio 150.

Figure 6A:
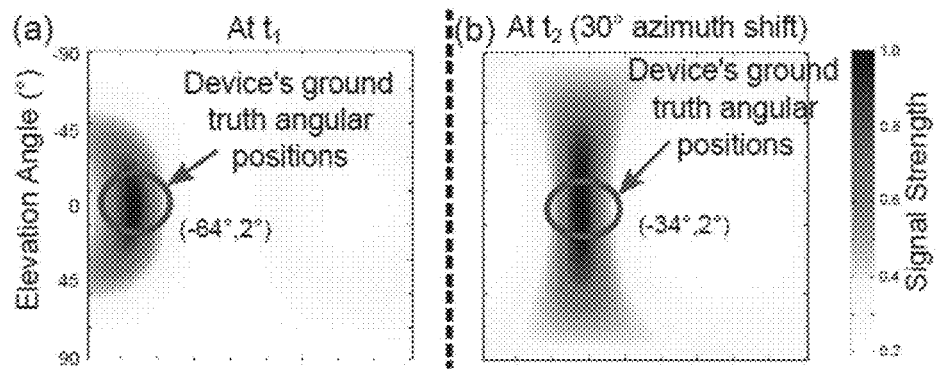
FIGS. 6A-6B are example chart diagrams of representative angular shifts in two dimensions of measured signal strengths for a Wi-Fi channel and a corresponding millimeter-wave channel, respectively, according to some examples of the present disclosure.
Figure 6B:
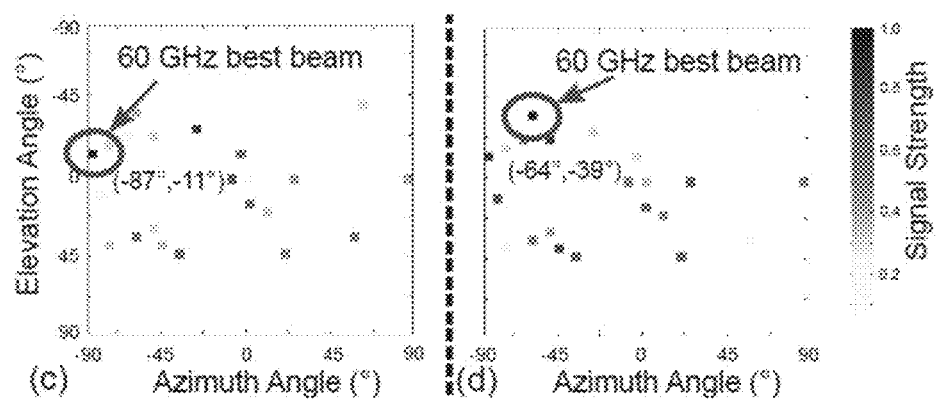

However, it may be noted that determining the absolute angular shift (Δφ, Δθ) and thus identifying the new dominant path direction (φ+Δφ, θ+Δθ) may yet be insufficient to determine either of the adapted beam direction k*' or the shifted complex gain D'(φ+Δφ, θ+Δθ). In that regard, FIGS. 6A-6B are example chart diagrams of a representative angular shift in two dimensions of measured signal strengths for a Wi-Fi channel and a corresponding millimeter-wave channel, respectively, according to some examples of the present disclosure. In FIG. 6A, the CSI of the Wi-Fi channel reflects a 30° azimuthal shift in the absolute position of the profile state, from (−64°, 2°) at time $t_1$ to (−34°, 2°) at time $t_2$. In FIG. 6B, however, the adapted beam direction k*' of the corresponding millimeter-wave channel shows no direct correlation to the absolute angular shift (Δφ, Δθ) in the dominant path as measured by the CSI of the Wi-Fi signal. Thus, even a narrower searching of a cluster of beam directions spatially nearby the new dominant path (φ+Δφ, θ+Δθ) may not yield the adapted beam direction k*'.

As noted previously, the new dominant path may align most with an arbitrary "side lobe" of the adapted beam direction k*', such that the adapted beam direction k*' may point spatially away from the new dominant path. The signal strength based on the shifted complex gain $D'(\varphi+\Delta\theta, \theta+\Delta\theta)$ that aligns to the new dominant path $(\varphi+\Delta\varphi, \theta+\Delta\theta)$ may also vary similarly.

In several examples of the present disclosure, the millimeter-wave device 101 instead applies a "reverse engineering" model to estimate the shifted complex gain $D'(\varphi+\Delta\varphi, \theta+\Delta\theta)$, working back from a measured gain $|h_k|$ of the first radio 130 operating at the current beam direction k based on the first set of CSI 140. In particular, the millimeter-wave device 101 may generate a model response $|h_k^m|$ of the measured gain $|h_k|$ to the new dominant path $(\varphi+\Delta\varphi, \theta+\Delta\theta)$ based on equation (3), while also matching the model response $|h_k^m|$ with the measured gain $|h_k|$, thus arriving at an estimate of the shifted complex gain $D'(\varphi+\Delta\varphi, \theta+\Delta\theta)$:

$$|h_k^m| = |\Sigma_{\varphi,\theta} G_k(\varphi,\theta) \cdot D'(\varphi+\Delta\varphi,\theta+\Delta\theta)| \quad (10)$$

$$D'(\varphi + \Delta\varphi, \theta + \Delta\theta) = \operatorname*{argmin}_{D'} ||h_k| - |h_k^m||^2 \quad (11)$$

After estimating by modeling, the millimeter-wave device 101 may apply the shifted complex gain $D'(\varphi+\Delta\varphi, \theta+\Delta\theta)$ to determine the adapted beam direction k*' via equation (3). As noted with respect to equation (3), the millimeter-wave device 101 may use known beam patterns $G_k(\varphi, \theta)$ in equation (10) without searching or probing by the first radio 130. Similarly, the millimeter-wave device 101 may then apply the shifted complex gain $D'(\varphi+\Delta\varphi, \theta+\Delta\theta)$ as estimated to determine k*' by equation (3) without searching or probing by the first radio 130.

In several examples of the present disclosure, the millimeter-wave device 101 thereby predicts an adapted beam direction k*' of a new dominant path by convolving a known beam pattern $G_k(\varphi, \theta)$ with a shifted complex gain $D'(\varphi+\Delta\theta, \theta+\Delta\theta)$, based on tracking an angular shift in a signal distinct from the beamformed or millimeter-wave signal of the first radio 130. The millimeter-wave device 101 may map the signal strength to a PHY rate of the first radio 130. Thus, equations (3) and (8) through (11) may facilitate adaptation instructions 175 of the millimeter-wave device 101 to adapt the first radio 130 from the first set of CSI 140 to the third set of CSI 180, including a determined signal strength at an adapted beam direction of the first radio 130, according to several examples of the present disclosure.

As previously noted, a millimeter-wave channel may tend to be sparse, such that it is characterized by a single dominant path, e.g. a line-of-sight path. The "reverse engineering" model as presented in equations (10) and (11) above may presume such a single dominant path, as an assumption of the prediction or determination process for adaptation. However, on occasion one or more side paths may have higher-order signal strengths relative to the dominant path, for example due to strong reflectors in the environment, such that a channel may instead include multiple dominating paths. The millimeter-wave device 101 may thus implement an error-tracking mechanism for use with the adaptation instructions 175 to avoid inaccurate "prediction" or determination of the adapted beam direction k*' and signal strength based on the third set of CSI 180. In some examples of the present disclosure, the millimeter-wave device 101 tracks a difference $\epsilon$ between the measured gain $|h_k|$ and the model response $|h_k^m|$ based on the measured gain $|h_k|$ that estimates the shifted complex gain $D'(\varphi+\Delta\varphi, \theta+\Delta\theta)$ along the new dominant path $(\varphi+\Delta\varphi, \theta+\Delta\theta)$, as in equations (10) and (11):

$$\epsilon = ||h_k| - |h_k^m||^2 \quad (12)$$

When the difference $\epsilon$ exceeds an error threshold, the millimeter-wave device 101 may note a presence or potential for multiple dominating paths. For example, the error threshold may be set to 1.5 dB, the average SNR separation of two PHY rate options of the first radio 130. The millimeter-wave device 101 may avoid an inaccurate "prediction" or determination in such multipath scenarios by use of additional processes for verification of the adaptation of the first radio 130. In some examples of the present disclosure, the millimeter-wave device 101 verifies one of the adapted beam direction k*' or the signal strength determined based on the third set of CSI 180 by performance of the IEEE 802.11ad standard process of BFT, including exhaustive scanning or probing of signal strengths over available beam directions, based on the difference $\epsilon$ exceeding the error threshold. Thus, the millimeter-wave device 101 may perform adaptation instructions 175 including up through equations (10) and (11) before the error-tracking as in equation (12) and the verification as via IEEE 802.11ad BFT.

Figure 7:
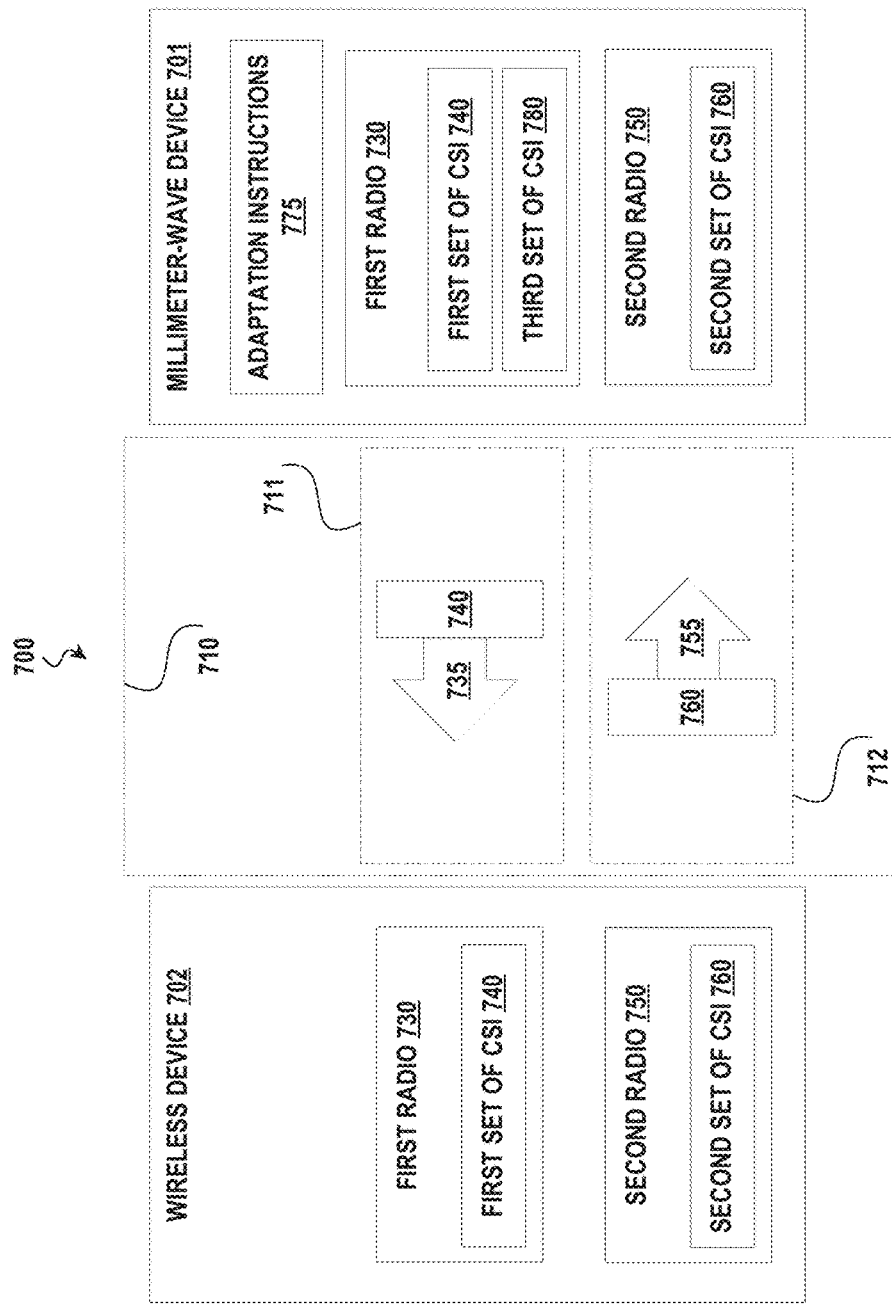
FIG. 7 is a block diagram of a wireless environment for use with the millimeter-wave device of FIG. 1, according to some examples of the present disclosure.

As noted, wireless communication and adaptation of the millimeter-wave device 101 of FIG. 1 or the first radio 130 of FIGS. 2A-2C may occur in a wireless environment with respect to a second wireless device. In that regard, FIG. 7 is a block diagram of an environment 700, according to some examples of the present disclosure. The environment 700 may include a millimeter-wave device 701, a wireless device 702, and a spatial environment 710 between the devices that include a first channel 711 and a second channel 712. As noted earlier, a channel may refer to any wireless link characterized by CSI, such that any wireless signal or suitable communication sent or received between two devices may establish or conform to a respective channel. In FIG. 7, a representative signal 735 operates in the first channel 711 based on a first set of CSI 740. Similarly, a representative signal 755 operates in the second channel 712, based on a second set of CSI 760.

Millimeter-wave device 701 may be substantially identical to millimeter-wave device 101 of FIG. 1. In particular, the first radio 730 may be substantially identical to the first radio 130 of FIG. 1, the second radio 750 may be substantially identical to the second radio 150 of FIG. 1, and the adaptation instructions 775 may be substantially identical to the adaptation instructions 175 of FIG. 1. As such, millimeter-wave device 701 may illustrate any device suitable to transmit, send, receive, or otherwise to operate with a millimeter-wave wireless signal, including an access point with capacity to operate under the IEEE 802.11ad standard, as noted earlier. The millimeter-wave device 701 may have dual capacity to send, receive, or transmit multiple wireless signals independently or simultaneously, including representative signals 735 and 755 as illustrated in FIG. 7. The millimeter-wave device 701 may include a combination of digital and analog elements and any combination of other elements, including elements suitable to an integrated circuit, in any suitable combination.

Wireless device 702 illustrates any device suitable to communicate wirelessly with the millimeter-wave device 701, including by millimeter-wave wireless communication. The wireless device 702 may be substantially identical to the millimeter-wave device 701. In particular, the wireless device 702 may include a first radio 730 and a second radio 750 that are respectively each substantially identical to those of the millimeter-wave device 701. The wireless device 702 may be a client device with respect to the millimeter-wave device 701. The wireless device 702 may have dual capacity to send, receive, or transmit multiple wireless signals independently or simultaneously, including representative signals 735 and 755 of FIG. 7. Like the millimeter-wave device 701, the wireless device 701 may include a combination of digital and analog elements and any combination of other elements, including elements suitable to an integrated circuit, to be connected in any suitable combination.

Channels 711 and 712 illustrate wireless communication links between the devices 701 and 702 through the spatial environment 710 that are respectively characterized by the first set of CSI 740 and the second set of CSI 760. The channels 711 and 712 may correspond respectively to the first radio 730 and the second radio 750. The channels 711 and 712 may each correspond with signal characteristics such as central frequency, channel width, frequency range, and maximum power level, as determined by the millimeter-wave device 701. For example, the millimeter-wave device 701 may determine the channels 711 and 712 pursuant to the IEEE 802.11 Wi-Fi standards of operation respectively for the first radio 730 and the second radio 750. In general, wireless communication between the devices 701 and 702 may include simultaneous, concurrent, or otherwise independent signal transmissions. Multiple packets, frames, or signals suitable to wireless communication, such as representative signals 735 and 755, may use the same channels 711 and 712, based on the same respective sets of CSI 740 and 760. The channels 711 and 712 may be non-overlapping. In several examples of the present disclosure, the first channel 711 is a millimeter-wave channel, such as in the 60-GHz band under IEEE 802.11ad, and the second channel 712 is a non-millimeter-wave Wi-Fi channel, such as in the 5-GHz band under IEEE 802.11ac.

The sets of CSI 740, 760, and 780 each illustrate a determination or characterization of channels 711 or 712 by the respective radio 730 or 750, as illustrated. The sets of CSI 740, 760, and 780 may be substantially identical to the sets of CSI 140, 160, and 180 of FIG. 1, respectively. Thus, the millimeter-wave device 101 may determine the sets of CSI 740 and 760 by estimation via feedback collection from the wireless device 702. The first radio 730 may operate at a current beam direction based on the first set of CSI 740. The second radio 750 may measure the second set of CSI 760. In several examples of the present disclosure, the adaptation instructions 775 then enable the millimeter-wave device 701 to determine the third set of CSI 780 based on the first set of CSI 740 and the second set of CSI 760, including a signal strength at an adapted beam direction of the first radio 730. Thus, the first radio 730 may operate based on the CSI 740, as illustrated by representative signal 735, so long as the environment 700 remains static over an interval of time. In several examples of the present disclosure, the millimeter-wave device 701 determines the third set of CSI 780 for adaptation of the first radio 730, such that a subsequent representative signal 735 is to be based on the third set of CSI 780 rather than on the first set of CSI 740, for example when the environment 700 undergoes a dynamic variation between transmissions. When the first radio 730 operates by beamforming, such as via phased array illustrated in FIGS. 2A-2C, the sets of CSI 740 and 780 may include beamforming effects over its available beam directions.

Wherein FIG. 7 illustrates the sets of CSI 740 and 760 as a block attached to the representative signals 735 and 755, respectively, each set of CSI may be understood to represent a current known state of the respective channel with respect to signal transmission. For example, the first set of CSI 340 is understood to represent a current known state for the first channel 711 of the first radio 730 at time of transmission of representative signal 735. Similarly, the second set of CSI 760 is understood to represent a current known state for the second channel 712 of the second radio 750 at time of transmission of representative signal 755. As noted with respect to FIG. 1, wherein FIG. 7 illustrates the first radio 730 as including both sets of CSI 740 and 780 as representative blocks, that radio may be understood as adapting between the sets of CSI over an interval of time. Thus, after the millimeter-wave device 701 performs adaptation of the first radio 730, the first radio 730 may operate with the representative signal 735 then based on the third set of CSI 780, not the first set of CSI 740.

Wherein FIG. 7 illustrates sets of CSI as representative blocks, each set of CSI may be understood to allow for distinct techniques of piecemeal, independent, or otherwise suitable measurement, estimation, or otherwise suitable determination by the millimeter-wave device 701 with respect to each channel separately. In some examples, the millimeter-wave device 701 may measure the first set of CSI 740 or the second set of CSI 760 over several frames or packets of signals in respective channels, including data or control frames such as acknowledgement (ACK) frames that use a second device to confirm transmission. In some examples, the millimeter wave device 701 may measure the second set of CSI 760 as a relative shift with respect to snapshots of a profile state over time, as noted with respect to equation (8). In some examples the millimeter-wave device 701 may measure the first set of CSI 740 by probing the first channel 711 to receive feedback from the wireless device 702.

With respect to the millimeter-wave device 701, FIG. 7 illustrates the representative signal 735 of the first radio 230 as "sent" and representative signal 755 of the second radio 750 as "received". Yet each of the channels 711 and 712 is understood to allow equally for any suitable combinations of sending and receiving by the millimeter-wave device 701, including additional signals, frames, or packets between the two devices without loss of generality in the performance of adaptation by the millimeter-wave device 701, as long as the millimeter-wave device 701 may measure the second set of CSI 760 by the second radio 750.

Figure 8:
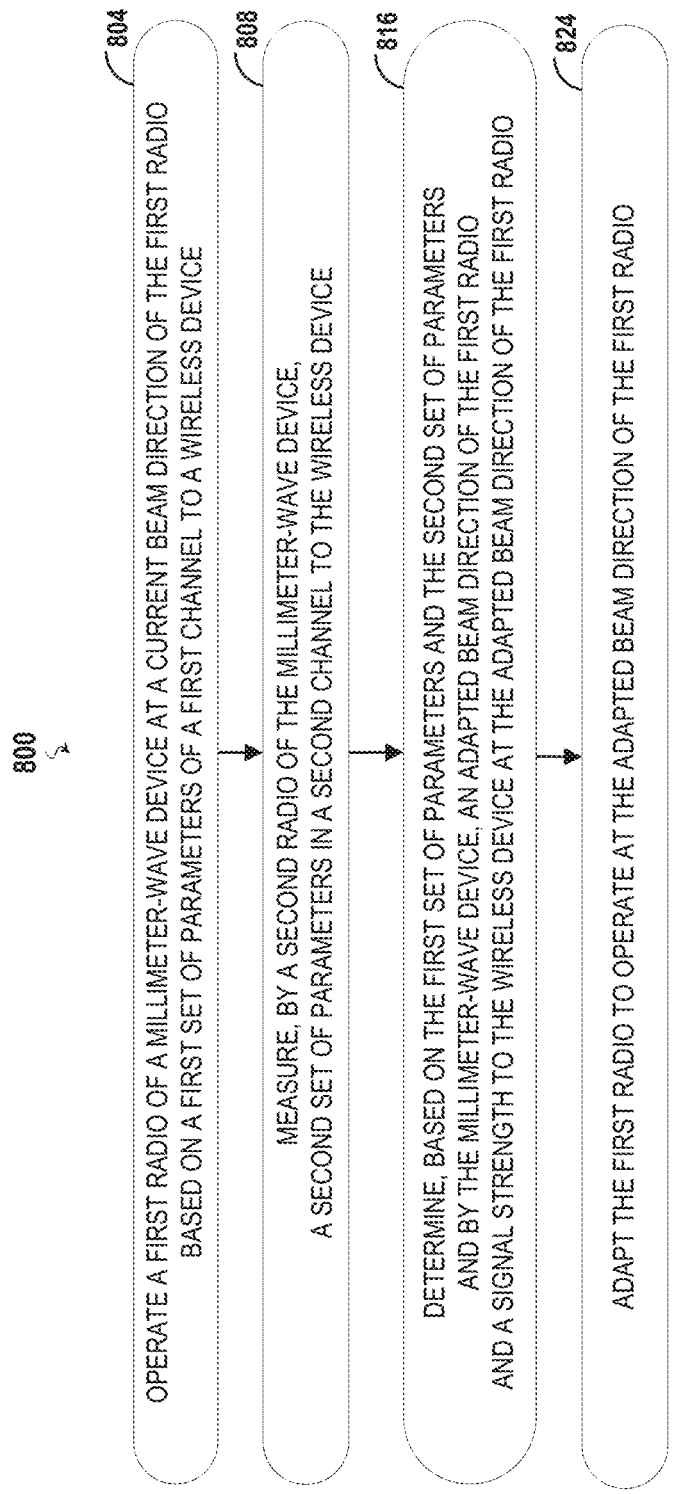
FIG. 8 is a flow diagram of a method of adapting a radio of the millimeter-wave device, according to some examples of the present disclosure.

Examples of a method for adapting a radio of a millimeter-wave device is illustrated with reference to FIG. 8. In that regard, FIG. 8 is a flow diagram of a method 800 of adapting a radio of a millimeter-wave device, according to some examples of the present disclosure. It is understood that the description of method 800 is non-limiting, and steps may be added to and omitted from the method 800 without departing from the disclosure. Unless noted otherwise, processes of the method 800 may be performed in any order including concurrently by one or more elements of the millimeter-wave device 101 of FIG. 1. In general, the method 800 is equally suitable for use with the millimeter-wave device 101 of FIG. 1, the first radio 230 of FIGS. 2A-2C, the millimeter-wave device 701 of FIG. 7, and/or any other suitable millimeter-wave devices to measure a second set of CSI by a second radio and adapt a first set of CSI of a first radio, such as via the adaptation instructions 175 or 775.

In block 804, the millimeter-wave device is to operate a first radio at a current beam direction of the first radio based on a first set of parameters of a first channel to a wireless device. For an example referencing FIG. 1 or FIG. 7, the millimeter-wave device 101 or 701 is to operate the first radio 130 or 730 based on the first set of CSI 140 or 740. As noted previously, the first set of CSI 140 or 740 may be understood to correspond to such a channel, as illustrated in FIG. 7 by the first channel 711 to wireless device 702. The millimeter-wave device 101 or 701 may determine the first set of CSI 140 or 740 by probing by the first radio 130 or 730, including by the BFT process of the IEEE 802.11ad standard.

In block 808, the millimeter-wave device is to measure by a second radio a second set of parameters in a second channel to the wireless device. For an example referencing FIG. 1 or FIG. 7, the millimeter-wave device 101 or 107 is to measure by the second radio 150 or 750 the second set of CSI 160 or 760. As noted previously, the second set of CSI 160 or 760 may be understood to correspond to such a channel, as illustrated in FIG. 7 by the second channel 712 to the wireless device 702. The second radio 150 or 750 may measure the second set of CSI 160 or 760 as snapshots of profile state over time intervals.

In block 816, the millimeter-wave device is to determine, based on the first set of parameters and the second set of parameters, an adapted beam direction of the first radio and a signal strength to the wireless device at the adapted beam direction of the first radio. For an example referencing FIG. 1 or FIG. 7, the millimeter-wave device 101 or 701 is to determine the third set of CSI 180 or 780 based on the first set of CSI 140 or 740 and the second set of CSI 160 or 760, including an adapted beam direction of the first radio 130 or 730 and a signal strength to the wireless device 702 at the adapted beam direction of the first radio 130 or 730. In several such examples of the present disclosure, the millimeter-wave device is to use adaptation instructions 175 or 775 to determine the third set of CSI 180 or 780. In several such examples of the present disclosure, the adaptation instructions 175 of FIG. 1 or 775 of FIG. 7 are to include one or more of equations (1) through (12) as discussed previously with respect to adaptation for beamforming in the first radio 230 of FIGS. 2A-2C. In some examples, the millimeter-wave device 101 or 701 is to determine the third set of CSI 180 or 780 based on a comparison of the first set of CSI 140 or 740 to the second set of CSI 160 or 760 with respect to a direction θ determined from the second set of CSI 160 or 760, such as discussed with respect to equations (4) through (7). In some examples, the millimeter-wave device 101 or 701 is to determine the third set of CSI 180 or 780 based on a model of "reverse engineering" the third set of CSI 180 or 780 from the first set of CSI 140 or 740, based on tracking of an angular shift in the second set of CSI 160 or 760 such as discussed with respect to equations (3) through (12). The third set of CSI 180 or 780 may be understood to correspond to an adapted beam direction and a signal strength of the first radio 130 or 730. The signal strength may correspond to a SNR of the third set of CSI 180 or 780. As previously noted, the third set of CSI 180 or 780 may include beamforming effects of the beam directions available to the first radio 130 or 730, including respective signal strengths. As noted with respect to equation (12), the millimeter-wave device 101 or 701 may perform a verification of the third set of CSI 180 or 780 when a value exceeds an error threshold.

In block 824, the millimeter-wave device is to adapt the first radio to operate at the adapted beam direction of the first radio. For an example referencing FIG. 1 or FIG. 7, the millimeter-wave device 101 or 701 is to adapt the first radio 130 or 730 to operate based on the third set of CSI 180 or 780, including the adapted beam direction of the first radio 180 or 780 and a signal strength to the wireless device 702 at the adapted beam direction. In several such examples of the present disclosure, the millimeter-wave device is to use adaptation instructions 175 or 775 to adapt the first radio 130 or 730. The millimeter-wave device 101 or 701 may map the signal strength to a PHY rate of the first radio 130 or 730, based on the MCS and by algorithmic mapping of SNR to PHY rate, as previously noted.

Figure 9:
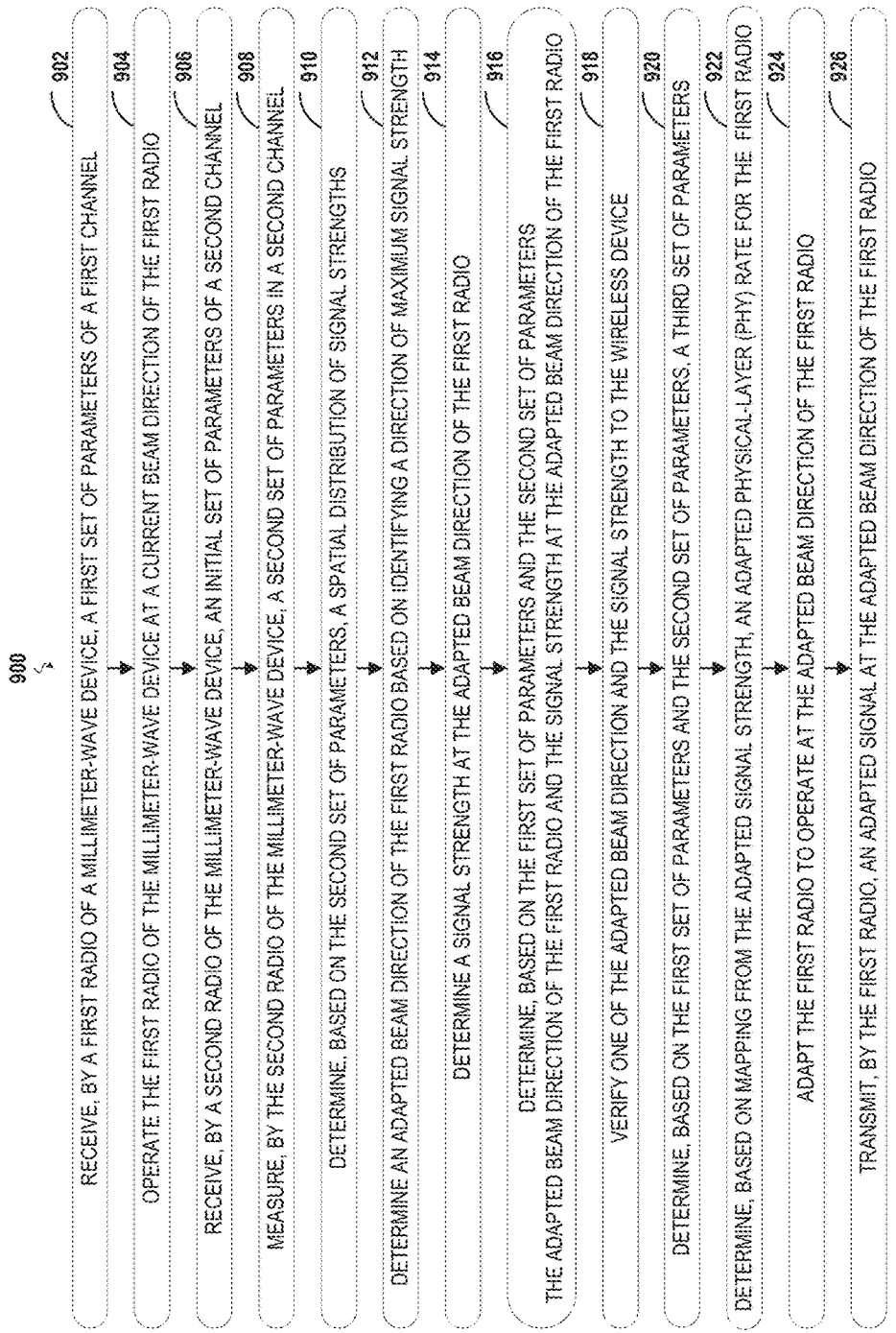
FIG. 9 is a flow diagram of a method of transmitting an adapted signal by a millimeter-wave device, according to some examples of the present disclosure.

Further examples are described in detail with reference to FIG. 9. In that regard, FIG. 9 is a flow diagram of a method of transmitting an adapted signal by a millimeter-wave device, according to some examples of the present disclosure. As noted with respect to method 800 of FIG. 8, it is understood that the description of method 900 is non-limiting, that steps may be added to and omitted from the method 900 without departing from the disclosure. Unless noted otherwise, processes of the method 900 may be performed in any order including concurrently by one or more elements of the optical transmitter device. In general, the method 900 is equally suitable for use with the millimeter-wave device 101 of FIG. 1, the first radio 230 of FIGS. 2A-2C, the millimeter-wave device 701 of FIG. 7, and/or any other suitable millimeter-wave devices to measure a second set of CSI by a second radio and adapt a first set of CSI of a first radio, such as via the adaptation instructions 175 or 775.

In block 902, the millimeter-wave device is to receive a first set of parameters of a first channel between the millimeter-wave device and a wireless device. For an example referencing FIG. 1 or FIG. 7, the millimeter-wave device 101 or 701 is to receive the first set of CSI 140 or 740 to operate the first radio 130 or 730. In some examples, the millimeter-wave device 101 or 701 may have the first set of CSI 140 or 740 preset as a profile state. In some examples, the millimeter-wave device 101 or 701 may probe the first channel 712 by the first radio 130 or 730 or otherwise receive feedback on signal transmission, such as from the wireless device 702, to estimate or otherwise to receive the first set of CSI 140 or 740.

In block 904, the millimeter-wave device is to operate the first radio based on the first set of parameters of the first channel to the wireless device. Block 904 may be performed substantially as described in block 804 of the method 800.

In block 906, the millimeter-wave device is to receive, by a second radio of the millimeter-wave device, an initial set of parameters of a second channel between the millimeter-wave device and the wireless device. For an example referencing FIG. 1 or FIG. 7, the millimeter-wave device 101 or 701 is to measure a first snapshot of the second set of CSI 160 or 760, as discussed with reference to profile state $W_1$ at time $t_1$ for equation (8). In some examples, the second radio 150 or 750 may probe the second channel 712 or otherwise receive feedback on signal transmission, such as from the wireless device 702, to estimate or otherwise to determine the set of CSI 160 or 760 as at a first snapshot or at an initial time.

In block 908, the millimeter-wave device is to measure, by the second set of the millimeter-wave device, a second set of parameters in a second channel to the wireless device. Block 908 may be performed substantially as described in block 808 of the method 800 or analogously as described in block 906. For an example referencing FIG. 1 or FIG. 7, the millimeter-wave device 101 or 701 is to measure a second snapshot of the second set of CSI 160 or 760, as discussed with reference to profile state $W_2$ at time $t_2$ for equation (8).

In block 910, the millimeter-wave device is to determine, based on the second set of parameters, a spatial distribution of signal strengths corresponding to the second radio. For an example referencing FIG. 1 or FIG. 7, the millimeter-wave device 101 or 701 is to determine a spatial distribution corresponding to the second radio 150 or 750 based on the second set of CSI 160 or 760. In several such examples of the present disclosure, the millimeter-wave device 101 or 701 is to use the adaptation instructions 175 or 775, including to determine the spatial distribution as discussed with respect to equation (4).

In block 912, the millimeter-wave device is to determine an adapted beam direction of the first radio, based on identifying a direction of maximum signal strength corresponding to the second radio. For an example referencing FIG. 1 or FIG. 7, the millimeter-wave device 101 or 107 is to determine an adapted beam direction of the first radio 130 or 730, based on identifying a direction of maximum signal strength corresponding to the second radio 150 or 750. In several such examples of the present disclosure, the millimeter-wave device 101 or 701 is to use the adaptation instructions 175 or 775, including to determine an adapted beam direction as discussed with respect to equations (4) through (7) and equations (8) through (12). As previously noted, the millimeter-wave device 101 or 701 may identify a direction of maximum signal strength corresponding to the second radio 150 or 750 based on the spatial distribution of signal strengths, such as determined in block 910.

In block 914, the millimeter-wave device is to determine a signal strength to the wireless device at the adapted beam direction of the first radio based on comparing the current beam direction to the adapted beam direction of the first radio. For an example referencing FIG. 1 or FIG. 7, the millimeter-wave device 101 or 701 is to determine a signal strength to the wireless device 702 at the adapted beam direction of the first radio 130 or 730 based on comparing the current beam direction based on the first set of CSI 140 or 740 to the adapted beam direction based on the third set of CSI 180 or 780. In several such examples of the present disclosure, the millimeter-wave device 101 or 701 is to use the adaptation instructions 175 or 775, including to determine a signal strength at an adapted beam direction as discussed with respect to equations (4) through (7) and equations (8) through (12).

In block 916, the millimeter-wave device is to determine, based on the first set of parameters and the second set of parameters, the adapted beam direction of the first radio and the signal strength to the wireless device at the adapted beam direction of the first radio. Block 916 may be performed substantially as described in block 816 of the method 800. In particular, block 916 may include processes substantially similar to those described in blocks 912 and 914. In several such examples, the millimeter-wave device 101 or 701 uses the adaptation instructions 175 or 775, including equations (1) through (11) to determine the third set of CSI 180 or 780 including a signal strength at an adapted beam direction of the first radio 130 or 730, based on the first set of CSI 140 or 740 and the second set of CSI 160 or 760.

In block 918, the millimeter-wave device is to verify one of the adapted beam direction and the signal strength to the wireless device, after the determining of the signal strength at the adapted beam direction exceeds an error threshold. For an example referencing FIG. 1 or FIG. 7, the millimeter-wave device 101 or 701 is to verify the third set of CSI 180 or 780, including a signal strength at an adapted beam direction of the first radio 130 or 730, based on the signal strength exceeding an error threshold. In several such examples, the millimeter-wave device 101 or 701 uses the adaptation instructions 175 or 775, including equation (12) with respect to error tracking. For example, the error threshold may be preset to 1.5 dB, an average separation of two PHY rates of the first radio 130 or 730, or any other suitable value determined by the millimeter-wave device 101 or 701. In several such examples, the millimeter-wave device 101 or 701 may verify the third set of CSI 180 or 780 by performing the BFT under IEEE 802.11ad to scan or probe available beam directions.

In block 920, the millimeter-wave device is to determine a third set of parameters of the first channel to the wireless device, based on the first set of parameters and the second set of parameters. For an example referencing FIG. 1 or FIG. 7, the millimeter-wave device 101 or 701 is to determine the third set of CSI 180 or 780 based on the first set of CSI 140 or 740 and the second set of CSI 160 and 760. In several such examples, the millimeter-wave device 101 or 701 uses the adaptation instructions 175 or 775, including equations (1) through (12) with respect to performing adaptation of the first radio 130 or 730.

In block 922, the millimeter-wave device is to determine an adapted physical-layer (PHY) rate for the first radio. In some examples referencing FIG. 1 or FIG. 7, the millimeter-wave device 101 or 107 is to determine a PHY rate for the first radio 130 or 730 based on the third set of CSI 180 or 780. As previously noted, the millimeter-wave device 101 or 701 may map the signal strength to a PHY rate of the first radio 130 or 730, based on the MCS and by algorithmic mapping of the signal strength via SNR to an adapted PHY rate.

In block 924, the millimeter-wave device is to adapt the first radio to operate at the adapted beam direction of the first radio. Block 924 may be performed substantially as described in block 824 of the method 800.

In block 926, the millimeter-wave device is to transmit, by the first radio, an adapted signal at the adapted beam direction of the first radio. In an example referencing FIG. 1 or FIG. 7, the millimeter-wave device 101 or 701 is to transmit an adapted signal by the first radio 130 or 730 based on the third set of CSI 180 or 780, such as representative signal 735 in the first channel 711 to wireless device 702 as shown in FIG. 7, except for that the first set of CSI 740 attached in FIG. 7 is adapted and replaced by the third set of CSI 780.

Figure 10:
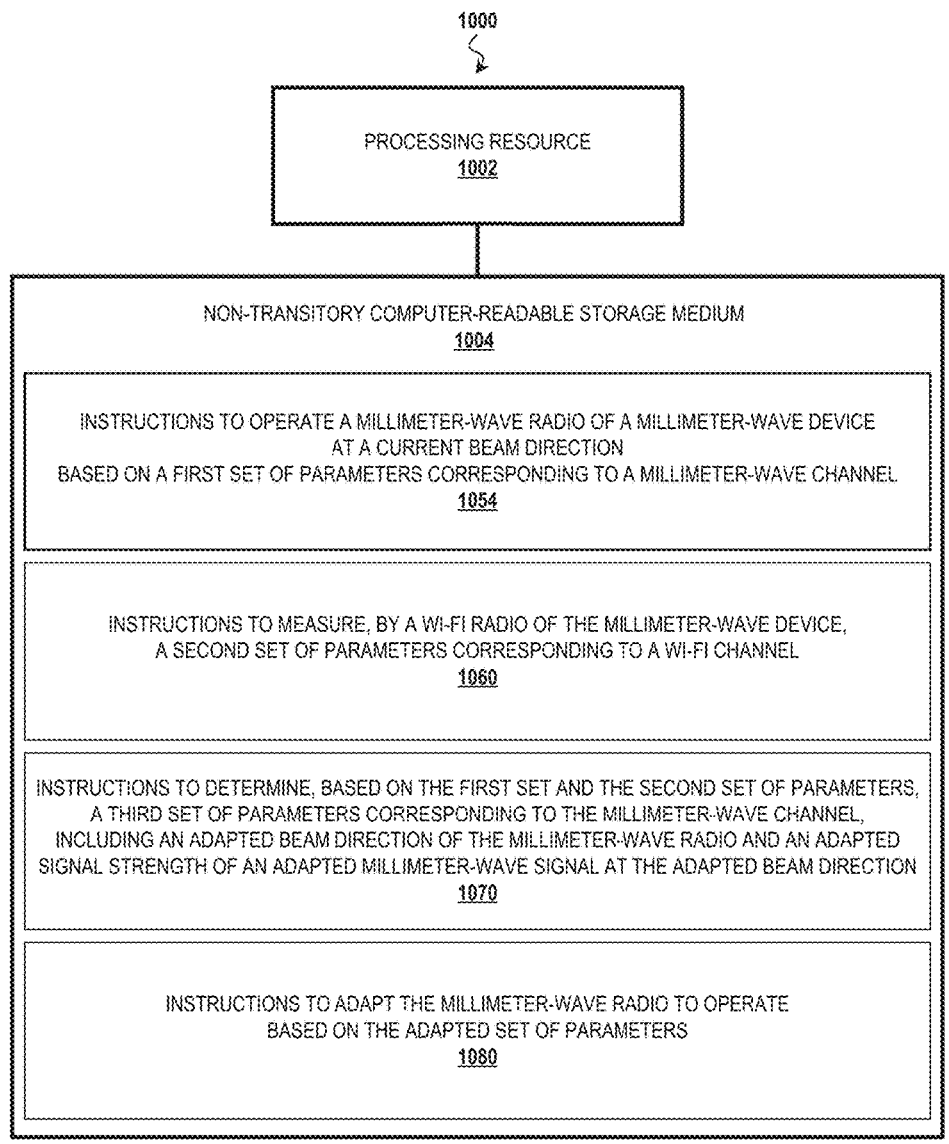
FIG. 10 is a block diagram of a system including a processing resource and a non-transitory computer-readable storage medium, according to some examples of the present disclosure.

Examples of a medium for use in performing the processes of method 800 or 900 are described in further detail in the context of FIG. 10. In that regard, FIG. 10 is a block diagram of a system 1000 including a processing resource 1002 and a non-transitory computer-readable storage medium 1004, according to some examples of the present disclosure. The processing resource 1002 may correspond to a processing resource of the millimeter-wave device 101 of FIG. 1 or 701 of FIG. 7. Similarly, the storage medium 1004 may correspond to a storage medium of the millimeter-wave device 101 of FIG. 1 or 701 of FIG. 7. Thus, the system 1000 is suitable for use in any of the examples of FIGS. 1, 2A-2C, and 7 and may perform any of the processes of method 800 of FIG. 8 or of method 900 of FIG. 9. The processes of methods 800 or 900 may be performed by any combination of hard-coded and programmable logic in the processing resource 1002.

Referring to block 1054, the non-transitory computer-readable storage medium 1004 may store instructions that cause the processing resource 1002 to operate a millimeter-wave radio at a current beam direction based on a first set of parameters corresponding to a millimeter-wave channel. This may be performed substantially as described for block 804 of FIG. 8 or block 904 of FIG. 9.

Referring to block 1060, the non-transitory computer-readable storage medium 1004 may store instructions that cause the processing resource 1002 to measure, by a Wi-Fi radio of the millimeter-wave device, a second set of parameters corresponding to a Wi-Fi channel. This may be performed substantially as described for block 808 of FIG. 8 or block 908 of FIG. 9.

Referring to block 1070, the non-transitory computer-readable storage medium 1004 may store instructions that cause the processing resource 1002 to determine, based on the first set of parameters and the second set of parameters, a third set of parameters corresponding to the millimeter-wave channel, including an adapted beam direction of the millimeter-wave radio and an adapted signal strength of an adapted millimeter-wave signal at the adapted beam direction. This may be performed substantially as described for block 816 of FIG. 8 or block 916 of FIG. 9.

Referring to block 1080, the non-transitory computer-readable storage medium 1004 may store instructions that cause the processing resource 1002 to adapt the millimeter-wave radio to operate based on the adapted set of parameters. This may be performed substantially as described for block 824 of FIG. 8 or block 924 of FIG. 9.

Figure 11:
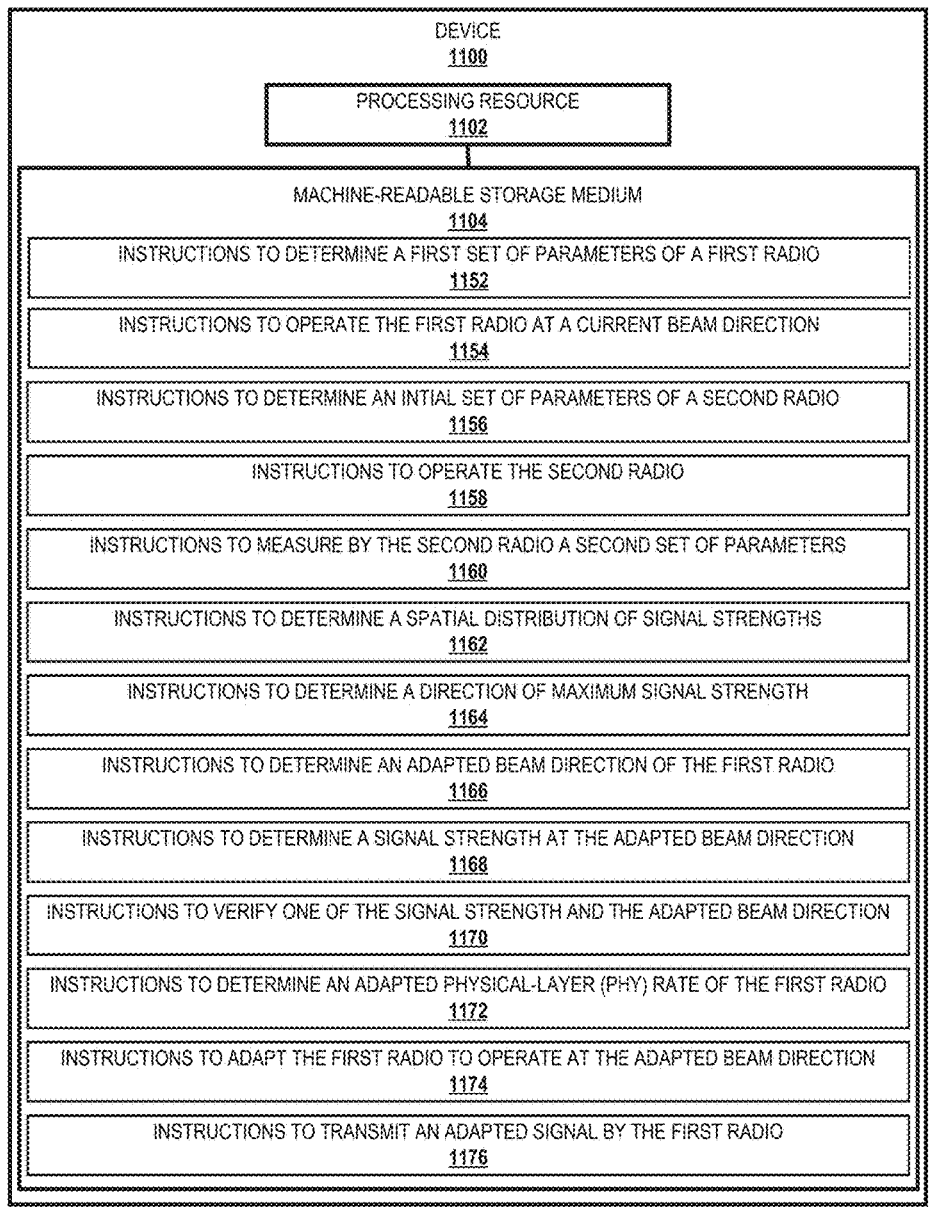
FIG. 11 is a block diagram of a millimeter-wave device including a processing resource and a computer-readable storage medium containing executable instructions, according to some examples of the present disclosure.

Examples of a device for use in performing the processes of methods 800 or 900 are described in further detail in the context of FIG. 11. In that regard, FIG. 11 is a block diagram of a device 1100 including a machine-readable storage medium 1104 containing executable instructions, according to some examples of the present disclosure. The device 1100 may be substantially similar to the millimeter-wave device 101 of FIG. 1 or 701 of FIG. 7; the processing resource 1102 may be substantially similar to the processing resource 1002 of FIG. 10; and the machine-readable medium 1104 may be substantially similar to the non-transitory computer-readable medium 1004 of FIG. 10. Thus, the device 1100 is suitable for use in any of the examples of FIGS. 1, 2A-2C, and 7 and may perform any of the processes of method 800 of FIG. 8 and/or method 900 of FIG. 9 as well as any of the executable instructions of the medium 1004 of FIG. 10. The processes of methods 800 or 900, as well as the executable instructions of the medium 1004 of FIG. 10, may be performed by any combination of hard-coded and programmable logic in the processing resource 1102.

Referring to block 1152, the machine-readable storage medium 1104 may store instructions that cause the processing resource 1102 to determine a first set of parameters of a first channel of a first radio. This may be performed substantially as described with respect to block 902 of FIG. 9.

Referring to block 1154, the machine-readable storage medium 1104 may store instructions that cause the processing resource 1102 to operate the first radio at a current beam direction based on the first set of parameters of the first channel to the wireless device. This may be performed substantially as described with respect to block 904 of FIG. 9 or block 804 of FIG. 8.

Referring to block 1156, the machine-readable storage medium 1104 may store instructions that cause the processing resource 1102 to determine an initial set of parameters of a second channel of a second radio. This may be performed substantially as described with respect to block 906 of FIG. 9.

Referring to block 1158, the machine-readable storage medium 1104 may store instructions that cause the processing resource 1102 to operate the second radio in the second channel. This may be performed substantially as described with respect to block 908 of FIG. 9 or block 808 of FIG. 8.

Referring to block 1160, the machine-readable storage medium 1104 may store instructions that cause the processing resource 1102 to measure by the second radio a second set of parameters of the second channel. This may be performed substantially as described with respect to block 908 of FIG. 9 or block 808 of FIG. 8.

Referring to block 1162, the machine-readable storage medium 1104 may store instructions that cause the processing resource 1102 to determine a spatial distribution of signal strengths in the second channel. This may be performed substantially as described with respect to block 910 of FIG. 9.

Referring to block 1164, the machine-readable storage medium 1104 may store instructions that cause the processing resource 1102 to determine a direction of maximum signal strength in the second channel. This may be performed substantially as described with respect to block 910 of FIG. 9.

Referring to block 1166, the machine-readable storage medium 1104 may store instructions that cause the processing resource 1102 to determine an adapted beam direction in the first channel of the first radio. This may be performed substantially as described with respect to blocks 912 or 916 of FIG. 9 or block 816 of FIG. 8.

Referring to block 1168, the machine-readable storage medium 1104 may store instructions that cause the processing resource 1102 to determine a signal strength at the adapted beam direction of the first radio. This may be performed substantially as described with respect to blocks 914 or 916 of FIG. 9 or block 816 of FIG. 8.

Referring to block 1170, the machine-readable storage medium 1104 may store instructions that cause the processing resource 1102 to verify one of the adapted signal strength and the adapted beam direction of the first radio. This may be performed substantially as described with respect to block 918 of FIG. 9.

Referring to block 1172, the machine-readable storage medium 1104 may store instructions that cause the processing resource 1102 to determine an adapted physical-layer (PHY) rate of the first radio. This may be performed substantially as described with respect to blocks 922 or 924 of FIG. 9 or block 824 of FIG. 8.

Referring to block 1174, the machine-readable storage medium 1104 may store instructions that cause the processing resource 1102 to adapt the first radio to operate at the adapted beam direction. This may be performed substantially as described with respect to block 924 of FIG. 9 or block 824 of FIG. 8.

Referring to block 1176, the machine-readable storage medium 1104 may store instructions that cause the processing resource 1102 to transmit an adapted signal by the first radio at the adapted beam direction. This may be performed substantially as described with respect to block 926 of FIG. 9.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, at least one processing resource may fetch, decode, and execute instructions stored on a storage medium to perform functionalities described above in relation to instructions stored on a storage medium. In other examples, the functionalities of any of the instructions may be implemented in the form of electronic circuitry, in the form of executable instructions encoded on a machine-readable storage medium, or a combination thereof. As used herein, a "computer-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any computer-readable storage medium described herein may be non-transitory. In examples described herein, a computer-readable storage medium or media may be part of an article (or article of manufacture). An article or article of manufacture may refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A millimeter-wave device, comprising:
a first radio to operate at a current beam direction based on a first set of channel state information (CSI) corresponding to a millimeter-wave channel; and
a second radio to measure a second set of CSI;
wherein the millimeter-wave device includes a set of instructions to:
adapt the first radio to operate at an adapted beam direction based on a third set of CSI including an adapted signal strength at the adapted beam direction that the millimeter-wave device is to determine based on the first set of CSI and the second set of CSI; and
verify one of the adapted beam direction and the adapted signal strength by probing for a feedback signal in the millimeter-wave channel in response to determining that the adapted signal strength at the adapted beam direction exceeds a predetermined threshold.

2. The millimeter-wave device of claim 1, wherein:
the first radio is a millimeter-wave radio that is to operate by beamforming; and
the first radio includes a set of phased arrays of antennas to perform beamforming.

3. The millimeter-wave device of claim 1, wherein:
the second radio is a Wi-Fi radio to operate based on an initial set of CSI; and
the second radio is to measure the second set of CSI in part by receiving the feedback signal.

4. The millimeter-wave device of claim 1, wherein:
the millimeter-wave device is to determine the adapted beam direction of the first radio based on determining a direction of maximum signal strength for the second radio.

5. The millimeter-wave device of claim 1, wherein:
the millimeter-wave device is to determine an adapted physical-layer (PHY) rate of the first radio based on mapping from the signal strength at the adapted beam direction.

6. A method comprising:
operating a first radio of a millimeter-wave device at a current beam direction of the first radio based on a first set of parameters corresponding to a millimeter-wave channel of a wireless device;
measuring, by a second radio of the millimeter-wave device, a second set of parameters corresponding to a different channel of the wireless device;
determining, based on the first set of parameters and the second set of parameters and by the millimeter-wave device, an adapted beam direction of the first radio and an adapted signal strength to the wireless device at the adapted beam direction of the first radio;
verifying one of the adapted beam direction and the adapted signal strength by probing for a feedback signal in the millimeter-wave channel in response to a determination that the adapted signal strength at the adapted beam direction exceeds a predetermined threshold; and
adapting the first radio to operate at the adapted beam direction of the first radio.

7. The method of claim 6, including:
transmitting, by the first radio, an adapted signal at the adapted beam direction.

8. The method of claim 6, including:
determining, by the millimeter-wave device and based on the second set of parameters, a spatial distribution of signal strengths corresponding to the second radio.

9. The method of claim 6, including:
determining the adapted beam direction based on identifying by the millimeter-wave device a direction of maximum signal strength corresponding to the second radio.

10. A non-transitory computer-readable storage medium, containing thereon instructions that, when executed, cause a processing resource to:
operate a millimeter-wave radio of a millimeter-wave device at a current beam direction based on a first set of parameters corresponding to a millimeter-wave channel;
measure, by a Wi-Fi radio of the millimeter-wave device, a second set of parameters corresponding to a Wi-Fi channel;
determine, based on the first set of parameters and the second set of parameters, a third set of parameters corresponding to the millimeter-wave channel of the first radio, including an adapted beam direction of the millimeter-wave radio and an adapted signal strength of an adapted millimeter-wave signal at the adapted beam direction;
verify one of the adapted beam direction and the adapted signal strength by probing for a feedback signal in the millimeter-wave channel in response to determining that the adapted signal strength at the adapted beam direction exceeds a predetermined threshold; and
adapt the millimeter-wave radio to operate based on the third set of parameters.

11. The non-transitory computer-readable storage medium of claim 10, including thereon instructions that, when executed, cause a processing resource to:
determine, based on the second set of parameters, a spatial distribution of signal strengths corresponding to the Wi-Fi channel of the Wi-Fi radio; and
determine the adapted beam direction of the millimeter-wave radio based on the spatial distribution of signal strengths corresponding to the Wi-Fi channel of the Wi-Fi radio.

12. The non-transitory computer-readable storage medium of claim 10, including thereon instructions that, when executed, cause a processing resource to:

determine the adapted signal strength of the adapted millimeter-wave signal at the adapted beam direction of the first radio, based on comparing the current beam direction of the first set of parameters to the adapted beam direction of the third set of parameters.

13. The non-transitory computer-readable storage medium of claim 10, including thereon instructions that, when executed, cause a processing resource to:
   determine, based on mapping from the adapted signal strength at the adapted beam direction, an adapted physical-layer (PHY) rate for the millimeter-wave radio.

14. The non-transitory computer-readable storage medium of claim 10, wherein:
   the second set of parameters includes a parameter selected from a group consisting of compressed beamforming feedback (CBF) and signal-to-noise ratio (SNR).

\* \* \* \* \*